United States Patent
Maruyama

(10) Patent No.: US 10,194,098 B2
(45) Date of Patent: Jan. 29, 2019

(54) IMAGING APPARATUS AND METHOD OF CONTROLLING IMAGING APPARATUS IN WHICH CORRESPONDING LINES IN PARTIALLY OVERLAPPING IMAGES ARE SEQUENTIALLY EXPOSED

(71) Applicant: SONY CORPORATION, Tokyo (JP)

(72) Inventor: Shunsuke Maruyama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/543,051

(22) PCT Filed: Oct. 20, 2015

(86) PCT No.: PCT/JP2015/079503
§ 371 (c)(1),
(2) Date: Jul. 12, 2017

(87) PCT Pub. No.: WO2016/121172
PCT Pub. Date: Aug. 4, 2016

(65) Prior Publication Data
US 2017/0366757 A1    Dec. 21, 2017

(30) Foreign Application Priority Data

Jan. 28, 2015 (JP) ................. 2015-013820

(51) Int. Cl.
*H04N 5/265* (2006.01)
*H04N 5/225* (2006.01)
(Continued)

(52) U.S. Cl.
CPC ........... *H04N 5/265* (2013.01); *H04N 5/2253* (2013.01); *H04N 5/2258* (2013.01);
(Continued)

(58) Field of Classification Search
CPC ...... H04N 5/265; H04N 5/378; H04N 5/2253; H04N 5/2353; H04N 5/335; H04N 5/3532;
(Continued)

(56) References Cited

U.S. PATENT DOCUMENTS 8,174,587 B2 *  5/2012  Fukuhara ............... H04N 19/63
                                                    348/222.1
8,934,037 B2 *  1/2015  Suzuki ................. H04N 5/3532
                                                    348/296
(Continued)

FOREIGN PATENT DOCUMENTS

JP    2001-061109 A    3/2001
JP    2001-223931 A    8/2001
JP    2002-051351 A    2/2002

OTHER PUBLICATIONS

International Search Report and Written Opinion of PCT Application No. PCT/JP2015/079503, dated Dec. 22, 2015, 1 pages of English Translation and 6 pages of ISRWO.

*Primary Examiner* — Luong T Nguyen
(74) *Attorney, Agent, or Firm* — Chip Law Group

(57) ABSTRACT

Image quality is to be increased by a compound-lens type imaging apparatus. Lines each having pixels arranged in a predetermined direction are arranged on the light receiving surface. The pixels each generate a pixel signal by performing exposure when supplied with an exposure start signal. First and second lenses form first and second images that partially overlap at overlapping portions on the light receiving surface. A scanning unit supplies the exposure start signal to a line sequentially selected in the overlapping portion of the first image among the lines, and the line corresponding to the selected line in the overlapping portion
(Continued)

of the second image. A combining unit combines images formed from pixel signals into one image.

9 Claims, 31 Drawing Sheets

(51) Int. Cl.
  *H04N 5/235* (2006.01)
  *H04N 5/378* (2011.01)
  *H04N 5/232* (2006.01)
  *H04N 5/341* (2011.01)
  *H04N 5/353* (2011.01)
  *H04N 5/376* (2011.01)

(52) U.S. Cl.
  CPC ....... *H04N 5/2353* (2013.01); *H04N 5/23238* (2013.01); *H04N 5/3415* (2013.01); *H04N 5/3532* (2013.01); *H04N 5/378* (2013.01); *H04N 5/3765* (2013.01)

(58) Field of Classification Search
  CPC ...... H04N 5/374; H04N 5/353; H04N 5/2258; H04N 5/23238; H04N 5/3415; H04N 5/3765; H01L 27/14643
  See application file for complete search history.

(56) References Cited

U.S. PATENT DOCUMENTS

| | | | |
|---|---|---|---|
| 9,900,536 B2* | 2/2018 | Morita | H04N 5/378 |
| 2005/0206757 A1* | 9/2005 | Itoh | H04N 5/378 348/294 |
| 2012/0105597 A1* | 5/2012 | Tajiri | G03B 35/02 348/49 |

* cited by examiner

IMAGING APPARATUS AND METHOD OF CONTROLLING IMAGING APPARATUS IN WHICH CORRESPONDING LINES IN PARTIALLY OVERLAPPING IMAGES ARE SEQUENTIALLY EXPOSED

CROSS REFERENCE TO RELATED APPLICATIONS

This application is a U.S. National Phase of International Patent Application No. PCT/JP2015/079503 filed on Oct. 20, 2015, which claims priority benefit of Japanese Patent Application No. JP 2015-013820 filed in the Japan Patent Office on Jan. 28, 2015. Each of the above-referenced applications is hereby incorporated herein by reference in its entirety.

TECHNICAL FIELD

The present technology relates to an imaging apparatus and a method of controlling the imaging apparatus. More particularly, the present technology relates to a compound-lens type imaging apparatus and a method of controlling the imaging apparatus.

BACKGROUND ART

Conventionally, a compound-lens type imaging apparatus provided with small-sized lenses is used to reduce the thickness or the size of an optical system (see Patent Document 1, for example). This compound-lens type imaging apparatus captures the same number of images as the number of the provided lenses, and combines these images to generate one image. For example, in a case where 16 small-sized lenses are provided, 16 images are captured, and are combined into one image.

CITATION LIST

Patent Document

Patent Document 1: Japanese Patent Application Laid-Open No. 2001-61109

SUMMARY OF THE INVENTION

Problems to be Solved by the Invention

In the above described conventional technology, however, when a moving object is imaged according to a rolling shutter method by which lines are sequentially exposed from the top, distortion might occur in images due to a difference in the exposure timing between lines. If such distortion occurs in each image, the quality of the image obtained by combining those images becomes lower.

The present technology has been made in view of those circumstances, and aims to improve image quality in a compound-lens type imaging apparatus.

Solutions To Problems

The present technology has been made to solve the above problems, and a first aspect thereof lies in an imaging apparatus that includes: lines each having pixels arranged in a predetermined direction, the pixels generating pixel signals by performing exposure when supplied with an exposure start signal; first and second lenses that form first and second images on a light receiving surface on which the lines are arranged, the first and second images partially overlapping at overlapping portions; a scanning unit that sequentially selects a line in the overlapping portion of the first image among the lines, and supplies the exposure start signal to the selected line and the corresponding line in the overlapping portion of the second image, the corresponding line corresponding to the selected line; and a combining unit that combines images formed from the pixel signals into one image. The first aspect of the present technology also lies in a method of controlling the imaging apparatus. With this, exposure is effectively started in a selected line in the overlapping portion of the first image and the line corresponding to the selected line in the overlapping portion of the second image.

Also, in the first aspect, the scanning unit may sequentially perform a process of supplying the exposure signal sequentially to the lines not included in the overlapping portions, and a process of supplying the exposure start signal sequentially to the corresponding line and the selected line. As a result, the lines not included in the overlapping portions are sequentially exposed, and exposure is effectively started in the selected line in the overlapping portion of the first image and the line corresponding to the selected line in the overlapping portion of the second image.

Further, in the first aspect, the imaging apparatus may further include a reading unit that simultaneously reads the pixel signal generated in the selected line and the pixel signal generated in the corresponding line, and the scanning unit may supply the exposure start signal simultaneously to the corresponding line and the selected line. This brings about an effect that the corresponding line and the selected line are exposed at the same time.

Also, in the first aspect, the light receiving surface may include an invalid area in which the first and second images are not to be formed, and the scanning unit may supply the exposure start signal to the lines not included in the invalid area. This brings about an effect that exposure is started in a line outside the invalid area.

Further, in the first aspect, the first and second images may be inverted images, and the scanning unit may sequentially select the lines in the first image, starting from the line adjacent to the second image. This brings about an effect that the lines in the first image are sequentially exposed, starting from the line adjacent to the second image.

Also, in the first aspect, the lines and the scanning unit may be arranged on different substrates from each other. Thus, the first and second images are formed on lines arranged on a substrate different from the scanning unit.

Meanwhile, a second aspect of the present technology lies in an imaging apparatus that includes: lines each having pixels arranged in a predetermined direction, the pixels generating pixel signals; first and second lenses that form first and second images on a light receiving surface on which the lines are arranged, the first and second images partially overlapping at overlapping portions; a reading unit that reads the pixel signals from lines designated for reading among the lines; a scanning unit that causes exposure to be performed on all the lines, sequentially selects a line in the overlapping portion of the first image among the lines, and designates, for the reading, the selected line and the corresponding line in the overlapping portion of the second image, the corresponding line corresponding to the selected line; and a combining unit that combines images formed from the pixel signals into one image. The second aspect of the present technology also lies in a method of controlling the imaging apparatus. With this, reading is effectively started in a selected line in the overlapping portion of the first image and the line corresponding to the selected line in the overlapping portion of the second image.

Effects of the Invention

According to the present technology, it is possible to achieve an excellent effect to increase image quality in a compound-lens type imaging apparatus. It should be noted that the effect of the present technology is not necessarily limited to that described herein, and may be any effect described in the present disclosure.

MODES FOR CARRYING OUT THE INVENTION

The following is a description of modes for carrying out the present technology (the modes will be hereinafter referred to as the embodiments). Explanation will be made in the following order.

1. First embodiment (an example where corresponding lines in partially overlapping images are sequentially exposed)

2. Second embodiment (an example where two corresponding lines in images are simultaneously exposed)

3. Third embodiment (an example where corresponding lines in images formed by a stacked imaging device are sequentially exposed)

1. First Embodiment

[Example Configuration of an Imaging Apparatus]

Figure 1:
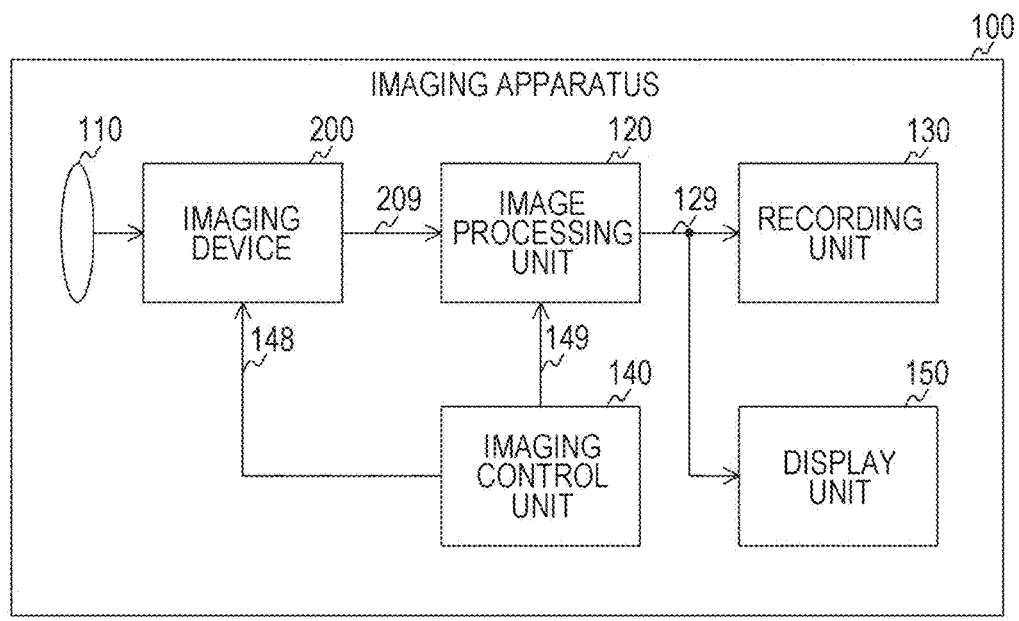
FIG. 1 is a block diagram showing an example configuration of an imaging apparatus in a first embodiment.

FIG. 1 is a block diagram showing an example configuration of an imaging apparatus 100 in an embodiment. The imaging apparatus 100 is an apparatus that captures an image, and includes an imaging lens 110, an imaging device 200, an image processing unit 120, a recording unit 130, an imaging control unit 140, and a display unit 150.

The imaging lens 110 is a lens that collects light from an object and guides the light to the imaging device 200. The imaging lens 110 includes microlenses, and, with the microlenses, forms images that are at least partially overlapping one another on the light receiving surface of the imaging device 200.

The imaging device 200 converts the received light into an electric signal to generate image data. For example, a complementary metal-oxide semiconductor (CMOS) sensor is used as the imaging device 200. The imaging device 200 supplies the generated image data to the image processing unit 120 via a signal line 209.

The image processing unit 120 performs predetermined image processing on the image data. For example, various kinds of image processing, such as a white balance process, a gamma correction process, and a demosaicing process, are performed. The image processing unit 120 supplies the image data subjected to the image processing to the recording unit 130 and the display unit 150 via a signal line 129. The recording unit 130 records the image data.

The imaging control unit 140 controls the entire imaging apparatus 100. The imaging control unit 140 supplies a control signal indicating the imaging timing and the exposure time to the imaging device 200 via a signal line 148, and causes the imaging device 200 to generate image data. The imaging control unit 140 also supplies a control signal indicating the timing of image processing to the image processing unit 120 via a signal line 149, and causes the image processing unit to perform image processing.

The display unit 150 displays image data.

It should be noted that the imaging apparatus 100 may further include an interface, and output image data to an external device via the interface.

In addition, although the imaging lens 110, the imaging device 200, the image processing unit 120, the recording unit 130, the imaging control unit 140, and the display unit 150 are provided in the same apparatus, they may be provided in different apparatuses. For example, the imaging device 200 and the like may be provided in the imaging apparatus 100, and the display unit 150 may be provided in a display apparatus or the like.

[Example Configuration of the Imaging Lens]

Figure 2A:
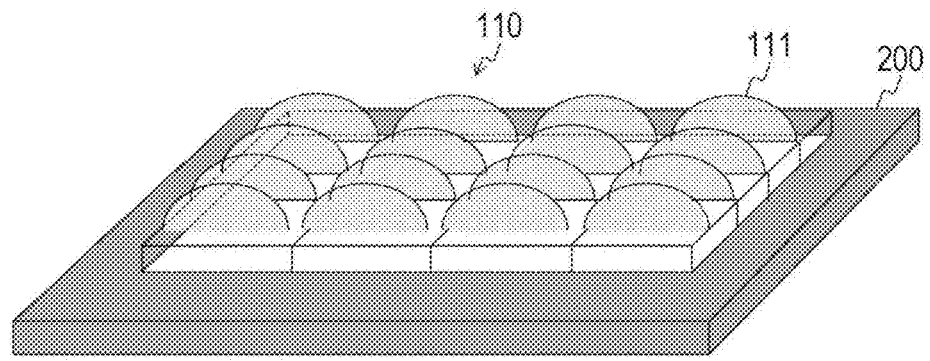
FIGS. 2a and 2b are diagrams showing an example of an imaging lens in the first embodiment.
Figure 2B:
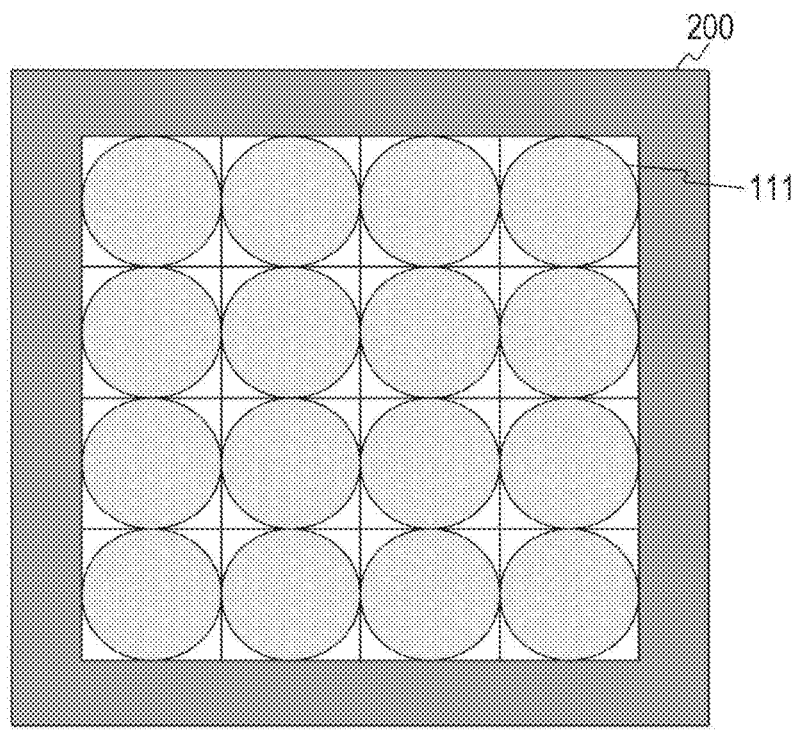

FIGS. 2a and 2b are diagrams showing an example of the imaging lens 110 in the first embodiment. It should be noted that FIG. 2a is a perspective view of the imaging lens 110, and FIG. 2b is a plan view of the imaging lens 110 as viewed from a direction perpendicular to the optical axis.

As shown in the example in FIGS. 2a and 2b, the imaging lens 110 includes microlenses 111. For example, 16 microlenses 111 are arranged in four rows and four columns (4×4). For each microlens 111, the imaging lens 110 also includes a correction lens (not shown) that inverts an image. With this correction lens, the vertical and horizontal directions of an image formed by the microlens 111 are adjusted to coincide with the vertical and horizontal directions of the object. Such an image is called an erected image. It should be noted that microlenses 111 are an example of the first and second lenses in the claims.

The microlenses 111 are arranged above the light receiving surface of the imaging device 200, and images (erected images) partially overlapping one another are formed on the light receiving surface by these microlenses 111. For example, in a case where 16 microlenses 111 are provided, 16 images are formed on the light receiving surface.

[Example Configuration of the Imaging Device]

Figure 3:
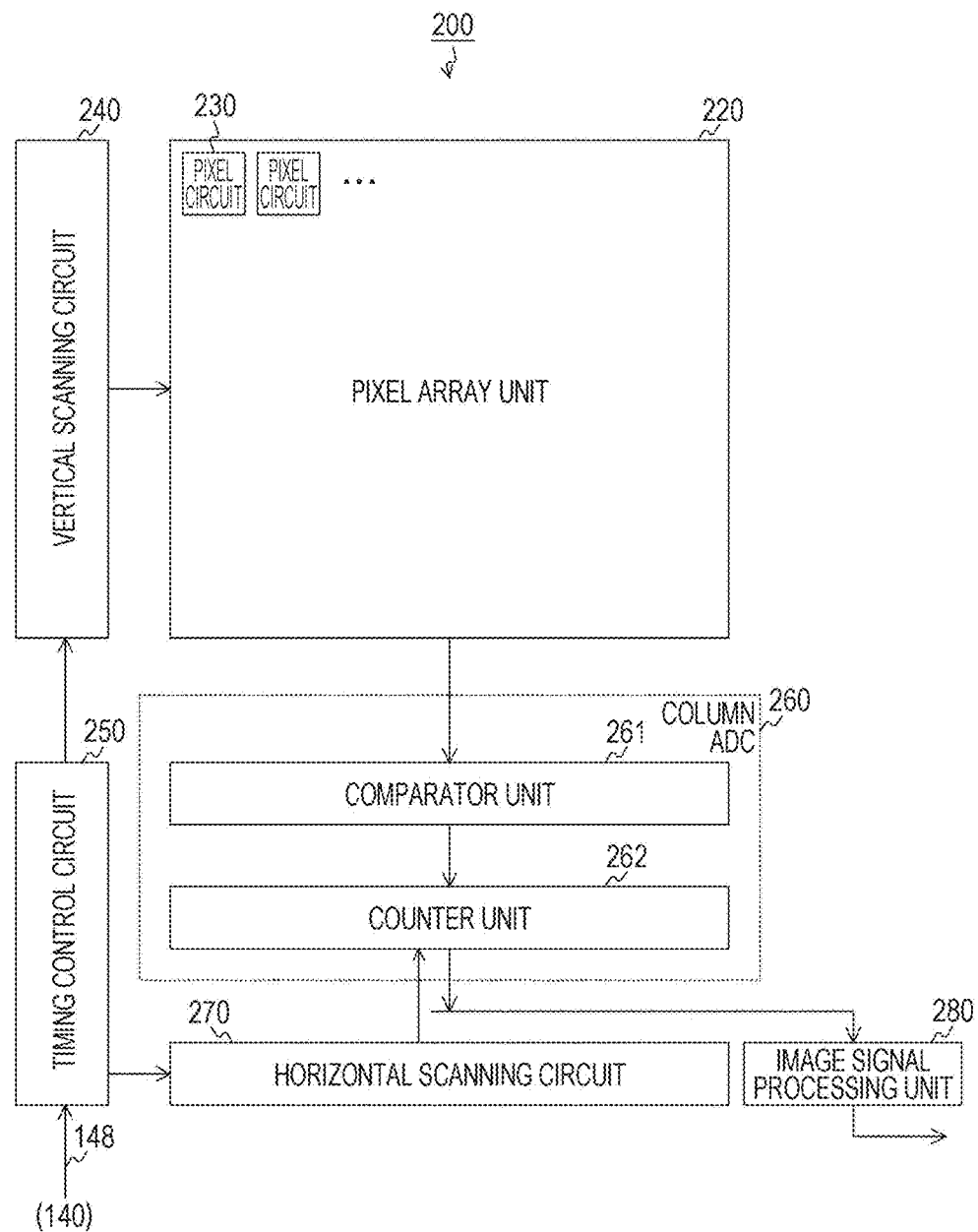
FIG. 3 is a block diagram showing an example configuration of an imaging device in the first embodiment.

FIG. 3 is a block diagram showing an example configuration of the imaging device 200 in the first embodiment. The imaging device 200 includes a pixel array unit 220, a vertical scanning circuit 240, a timing control circuit 250, a column analog-to-digital converter (ADC) 260, a horizontal scanning circuit 270, and an image signal processing unit 280. Also, the column ADC includes a comparator unit 261 and a counter unit 262. These circuits are provided on the same semiconductor chip.

The pixel array unit 220 has a light receiving surface perpendicular to the optical axis, and pixel circuits 230 are arranged in a two-dimensional lattice pattern on the light receiving surface.

The timing control circuit 250 controls the timings of scanning in rows and columns. Here, a row is formed with pixel circuits 230 arranged in one direction of the pixel array unit 220, and is also called a line. Meanwhile, a column has pixel circuits 230 arranged in a direction perpendicular to the rows in the pixel array unit 220. In the pixel array unit 220, the pixel circuits 230 are arranged n rows and m columns. Here, n and m are integers.

In synchronization with a vertical synchronization signal indicating the imaging timing, the timing control circuit 250 generates a horizontal synchronization signal indicating the timing of scanning a row, and supplies the horizontal synchronization signal to the vertical scanning circuit 240. Also, in synchronization with the horizontal synchronization signal, the timing control circuit 250 generates a timing signal indicating the timing to scan a column, and supplies the timing signal to the horizontal scanning circuit 270.

The vertical scanning circuit 240 sequentially selects each of the lines in synchronization with the horizontal synchronization signal. Every time a line is selected, the vertical scanning circuit 240 supplies an exposure start signal to the line so that exposure is performed. It should be noted that the vertical scanning circuit 240 is an example of the scanning unit in the claims.

When an exposure start signal is supplied from the vertical scanning circuit 240, a pixel circuit 230 performs exposure for a predetermined exposure time, and generates a pixel signal at the level corresponding to the exposure time. The pixel circuit 230 supplies the generated pixel signal to the comparator unit 261.

The comparator unit 261 compares the level of the pixel signal with the level of a predetermined reference signal. The reference signal may be a ramp signal having a level that gradually changes over a certain ramp period, for example. The ramp signal is generated by a digital-to-analog converter (DAC), for example. For ease of illustration in FIG. 3, the DAC is not shown therein. The comparator unit 261 includes a comparator for each column, and each of the comparators supplies a comparison result to the counter unit 262 in synchronization with a clock signal having shorter cycles than the ramp period.

The counter unit 262 counts the number of times that a specific comparison result is obtained (for example, the number of times the reference signal is determined to be higher than a pixel signal) within the ramp period of the ramp signal. The counter unit 262 includes a counter for each column. When a column selection signal is supplied from the horizontal scanning circuit 270, each of the counters supplies data indicating a count value as pixel data to the image signal processing unit 280.

The horizontal scanning circuit 270 selects each of the rows according to the timing signal. As the horizontal scanning circuit 270 sequentially outputs a column selection signal to each of the counters in accordance with the timing signal, so that the columns are selected.

The image signal processing unit 280 performs a process of combining the images in image data into one image, a process of removing noise, and the like. As described above, as multiple images are formed on the pixel array unit 220, the image data formed by the pixel data from the ADC 260 includes multiple images. The image signal processing unit 280 combines these images into one image, and outputs the combined image data to the image processing unit 120. In the combining, a process of adding up the overlapping pixels, and a process of calculating the average value of these pixels are performed on the overlapping portions of the images, for example. It should be noted that the image signal processing unit 280 is an example of the combining unit in the claims. Further, instead of the image signal processing unit 280, the image processing unit 120 may perform the combining process.

[Example Configuration of a Pixel Circuit]

Figure 4:
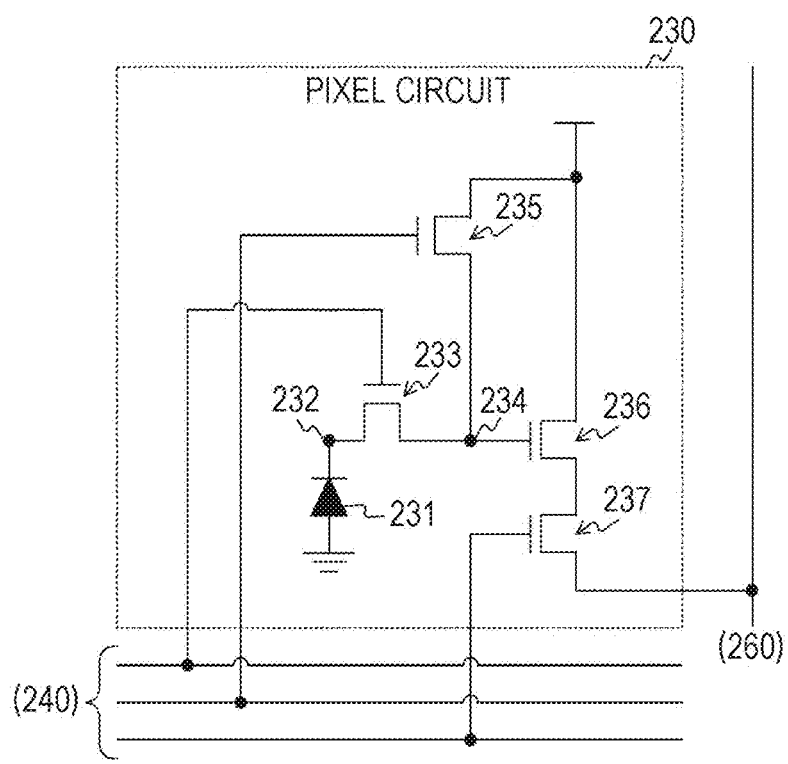
FIG. 4 is a block diagram showing an example configuration of a pixel circuit in the first embodiment.

FIG. 4 is a block diagram showing an example configuration of a pixel circuit 230 in the first embodiment. The pixel circuit 230 includes a photodiode 231, a node 232, a transfer transistor 233, a floating diffusion layer 234, a reset transistor 235, an amplification transistor 236, and a select transistor 237. For example, n-type metal-oxide-semiconductor (MOS) transistors are used as the transfer transistor 233, the reset transistor 235, the amplification transistor 236, and the select transistor 237.

The photodiode 231 converts light into electric charge, and outputs the electric charge to the node 232. The transfer transistor 233 transfers the electric charge, which has been converted by the photodiode 231, from the node 232 to the floating diffusion layer 234. The floating diffusion layer 234 generates a potential at the level corresponding to the amount of the transferred charge. The reset transistor 235 resets the charge amount in the floating diffusion layer 234 to an initial value. The amplification transistor 236 amplifies the potential of the floating diffusion layer 234. When the pixel circuit 230 is selected, the select transistor 237 outputs an electric signal of the amplified potential as a pixel signal to the column ADC 260.

Figure 5:
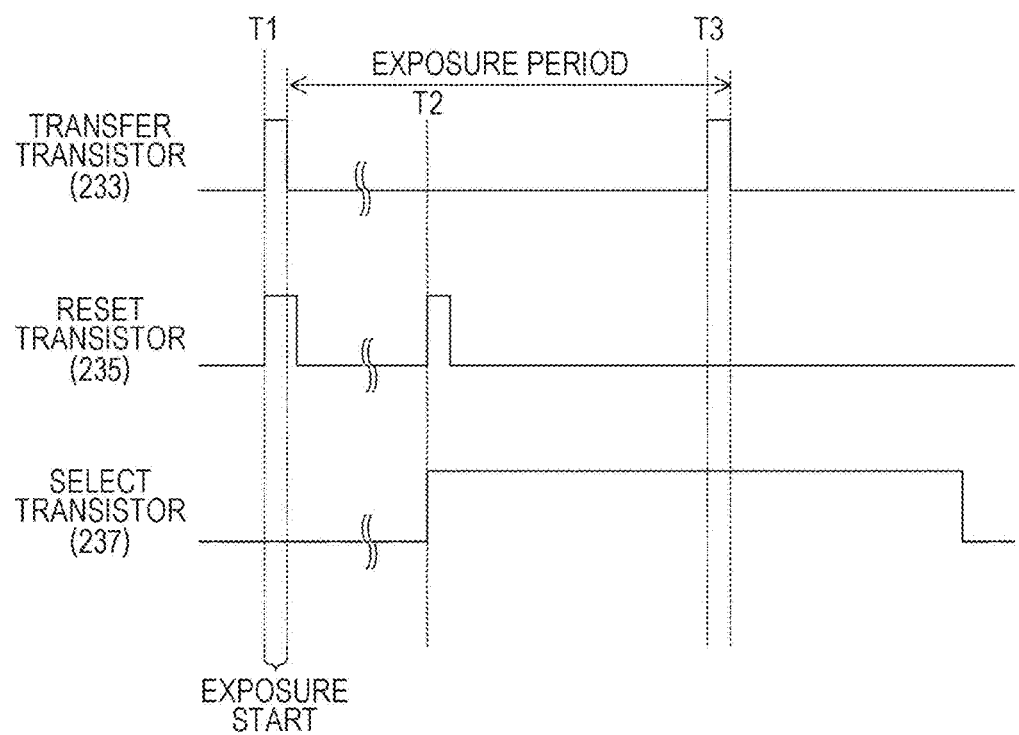
FIG. 5 is a timing chart showing an example of operation of a pixel circuit in the first embodiment.

FIG. 5 is a timing chart showing an example of operation of a pixel circuit 230 in the first embodiment.

The vertical scanning circuit 240 supplies a pulse signal to the transfer transistor 233 and the reset transistor 235 at timing T1 immediately before the exposure period, and controls these transistors to be both in an on-state. This pulse signal corresponds to the above-mentioned exposure start signal. As a result, all the charge accumulated in the node 232 is released to the power supply. When a certain pulse period has elapsed, the transfer transistor 233 and the reset transistor 235 enter the off-state. As a result, the node 232 is put into a floating state, and new charge accumulation (which is exposure) is started.

Subsequently, at timing T2 before the end of the exposure period, the vertical scanning circuit 240 controls the reset transistor 235 and the select transistor 237 to be in the on-state. Through this control, a reference potential is generated in the selected pixel circuit 230.

When the pulse period has elapsed since timing T2, the reset transistor 235 shifts to the off-state. As a result, the potential of the floating diffusion layer 234 drops from the reference potential by a certain amount, and is put into a floating state.

Then, at timing T3 immediately before the end of the exposure period, the vertical scanning circuit 240 controls the transfer transistor 233 to be in the on-state. Through this control, the charge accumulated in the node 232 is transferred to the floating diffusion layer 234, and the exposure is completed. After the completion of the exposure, the column ADC 260 reads a pixel signal of the voltage corresponding to the accumulated charge amount in the floating diffusion layer 234, and performs AD conversion, to convert the pixel signal to pixel data.

Figure 6A:
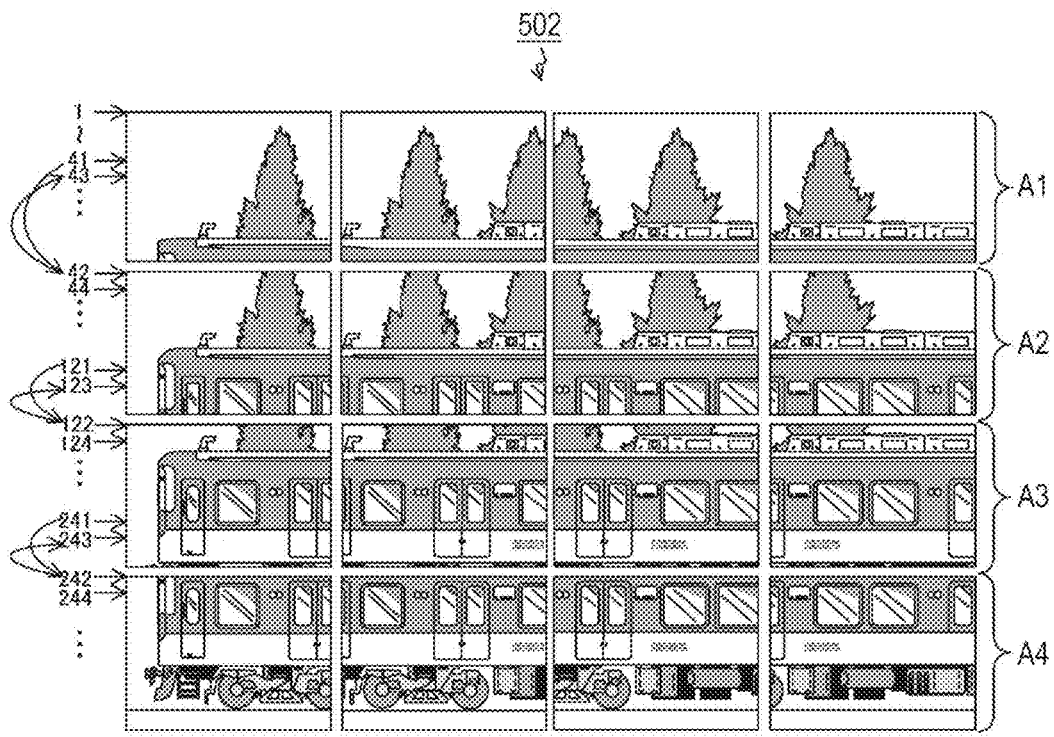
FIGS. 6a and 6b are diagrams for explaining a scanning method in the first embodiment.
Figure 6B:
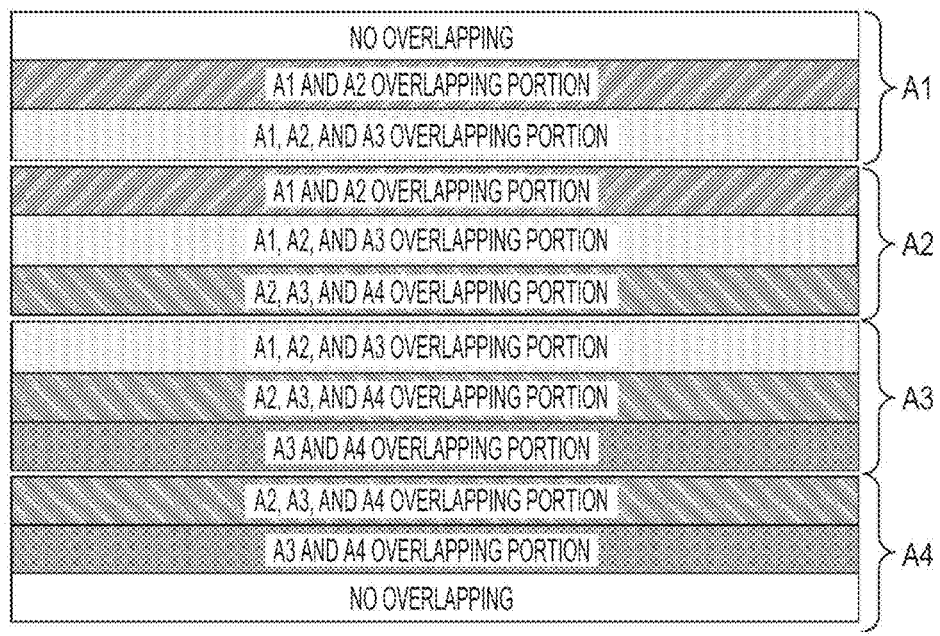

FIGS. 6*a* and 6*b* are diagrams for explaining a scanning method in the first embodiment. It should be noted that a of FIG. 6*a* is a diagram showing an example of image data 502 in the second embodiment. With the 16 microlenses 111, 16 identical images in four rows and four columns (4×4) are formed on the pixel array unit 220. As a result, the pixel array unit 220 generates the image data 502 including the only partially overlapping 16 images in the four rows and four columns (4×4).

Meanwhile, FIG. 6*b* is a diagram showing the overlapping portions among the respective areas. For example, where each of the areas is divided into the three areas of an upper portion, a central portion, and a lower portion in a direction perpendicular to the lines, the upper portion of an area A1 does not overlap with any of the other areas. Meanwhile, the central portion of the area A1 and the upper portion of an area A2 overlap, and the lower portion of the area A1, the central portion of the area A2, and the upper portion of an area A3 overlap.

Also, the lower portion of the area A2, the central portion of the area A3, and the upper portion of an area A4 overlap, and the lower portion of the area A3 and the central portion of the area A4 overlap. The lower portion of the area A4 does not overlap with any of the other areas.

Where the number of the lines in the image data 500 is 480, the four images in the first row are formed with the first to 120th lines, and the four images in the second row are formed with the 121st to 240th lines. Hereinafter, the area formed with the four images in the first row will be referred to as the area "A1", the area formed with the four images in the second row will be referred to as the area "A2". Likewise, the four images in the third section are formed with the 241st to 360th lines, and the four images in the fourth section are formed with the 361st to 480th lines. Hereinafter, the area formed with the four images in the third row will be referred to as the area "A3", the area formed with the four images in the fourth row will be referred to as the area "A4". It should be noted that, although the number of the lines in the image data is 480 in this example, the number of the lines is not limited to 480, and may be 720, for example.

The vertical scanning circuit 240 first sequentially exposes the lines in the upper portion of the area A1. The corresponding lines in the respective overlapping portions of the areas are then sequentially exposed. Here, "corresponding lines" means lines located in the same relative position in the direction perpendicular to the lines. For example, the first line in the central portion of the area A1 corresponds to the first line in the upper portion of the area A2.

Specifically, the vertical scanning circuit 240 first selects the first line in the central portion of the area A1, and causes exposure to be started. The vertical scanning circuit 240 then selects the first line in the upper portion of the line A2, and causes exposure to be started. After those first lines are exposed, the vertical scanning circuit 240 selects the second line in the central portion of the area A1, and causes exposure to be started. The vertical scanning circuit 240 then selects the corresponding line in the area A2, which is the second line in the upper portion, and causes exposure to be started. Thereafter, the lines are sequentially selected in a manner similar to the above. Also, in each line, pixel signal reading is started by the column ADC 260 when the exposure is completed.

A conventional vertical scanning circuit performs control so that the lines in the area A2 are sequentially exposed from the top after all the lines in the area A1 are sequentially exposed from the top. By such a method, however, the difference in the exposure start timing between corresponding lines in the areas A1 and A2 becomes larger. As a result, in the areas A1 and A2, distortion occurs due to the difference in the exposure timing, and the image quality of the image obtained by combining these areas is degraded.

On the other hand, where the vertical scanning circuit 240 starts exposure of a line in the area A1 and then starts exposure of the corresponding line in the area A2 as in the example shown in FIGS. 6a and 6b, the difference in the exposure timing between the corresponding lines in these areas becomes smaller. As a result, distortion due to the difference in the exposure timing between the areas A1 and A2 can be prevented or reduced, and the image quality of the image obtained by combining these areas can be increased.

[Example Operation of the Imaging Apparatus]

Figure 7:
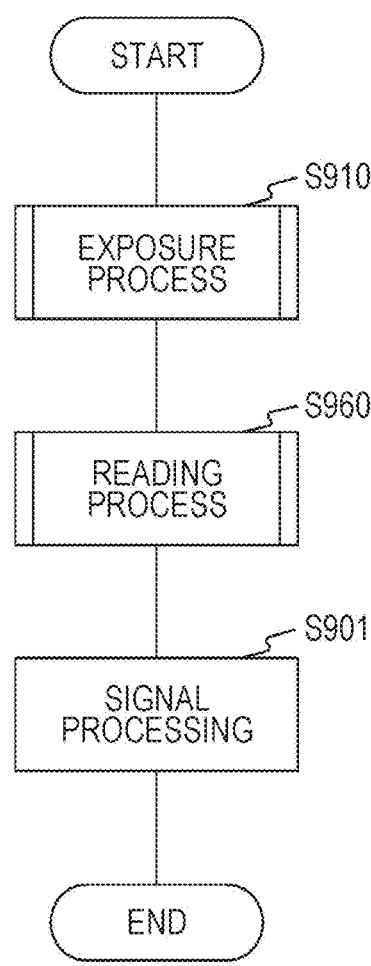
FIG. 7 is a flowchart showing an example operation of the imaging apparatus in the first embodiment.

FIG. 7 is a flowchart showing an example operation of the imaging apparatus 100 in the first embodiment. This operation is started when an operation for capturing an image from image data is performed, for example. The imaging apparatus 100 performs an exposure process to start exposure of each line (step S910). The imaging apparatus 100 also performs a reading process (step S970) to read an image signal from each line. The imaging apparatus 100 then performs signal processing to combine images (step S901). After step S901, the imaging apparatus 100 ends the operation for capturing an image.

Figure 8:
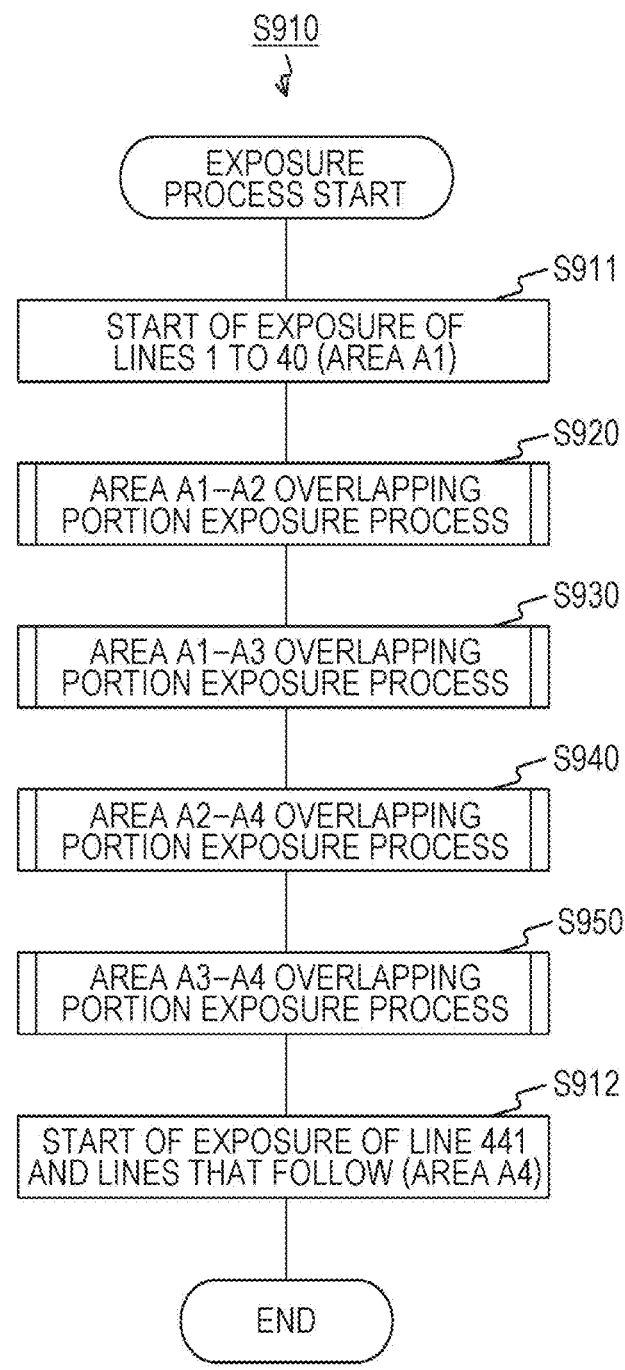
FIG. 8 is a flowchart showing an example of an exposure process in the first embodiment.

FIG. 8 is a flowchart showing an example of the exposure process in the first embodiment. The imaging apparatus 100 sequentially starts exposing the first through 40th lines (step S911), and performs an area A1-A2 overlapping portion exposure process to expose the overlapping portions in the areas A1 and A2 (step S920). The imaging apparatus 100 then performs an area A1-A3 overlapping portion exposure process to expose the overlapping portions in the areas A1 through A3 (step S930), and performs an area A2-A4 overlapping portion exposure process to expose the overlapping portions in the areas A2 through A4 (step S940). The imaging apparatus 100 performs an area A3-A4 overlapping portion exposure process to expose the overlapping portions in the areas A3 and A4 (step S950), and sequentially starts exposing the 441st line and the lines that follow (step S912). After step S912, the imaging apparatus 100 ends the exposure process.

Figure 9:
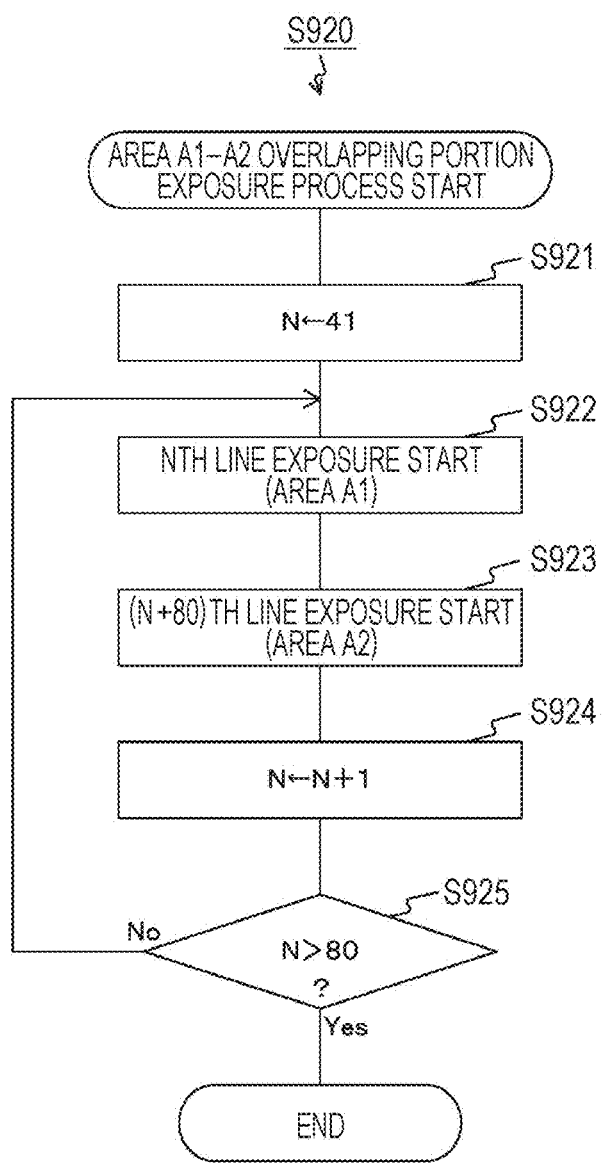
FIG. 9 is a flowchart showing an example of an area A1-A2 overlapping portion exposure process in the first embodiment.

FIG. 9 is a flowchart showing an example of the area A1-A2 overlapping portion exposure process in the first embodiment. The imaging apparatus 100 initializes N to 41 (step S921), and starts exposing the Nth line (step S922). The imaging apparatus 100 then starts exposing the (N+80)th line (step S923), and increments N (step S924). The imaging apparatus 100 determines whether N is greater than 80 (step S925). If N is equal to or smaller than 80 (step S925: No), the imaging apparatus 100 repeats the processes in step S922 and the steps that follow. If N is greater than 80 (step S925: Yes), the imaging apparatus 100 ends the area A1-A2 overlapping portion exposure process.

Figure 10:
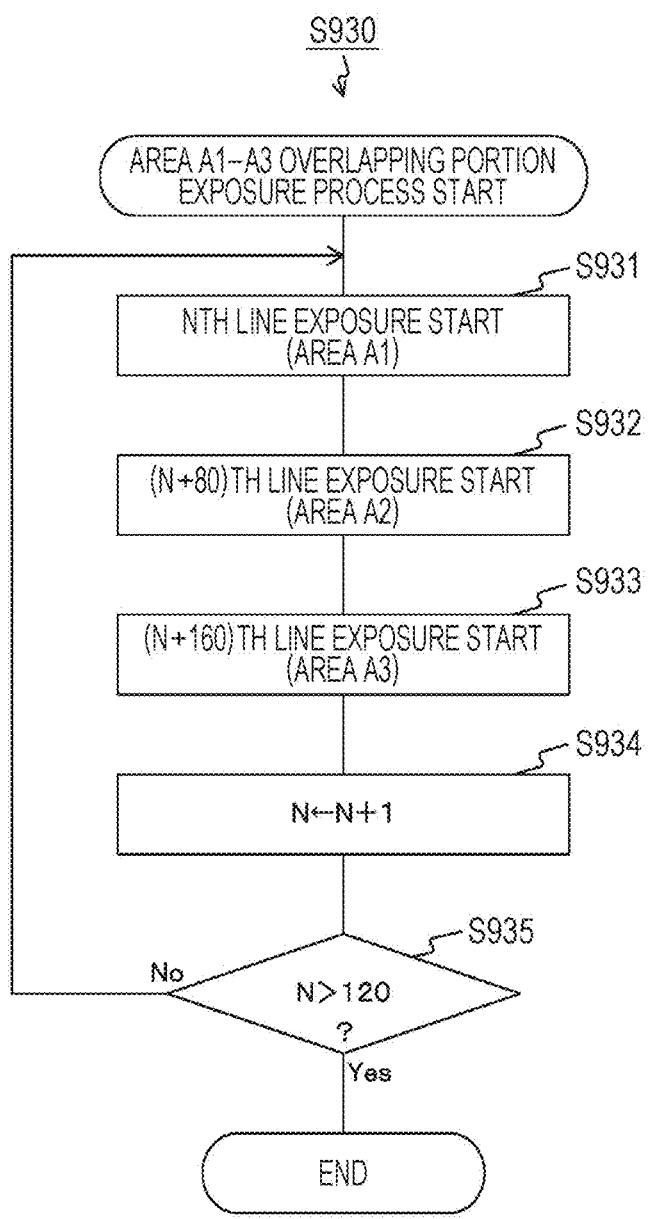
FIG. 10 is a flowchart showing an example of an area A1-A3 overlapping portion exposure process in the first embodiment.

FIG. 10 is a flowchart showing an example of the area A1-A3 overlapping portion exposure process in the first embodiment. The imaging apparatus 100 starts exposing the Nth line (step S931), and starts exposing the (N+80)th line (step S932). The imaging apparatus 100 then starts exposing the (N+160)th line (step S933), and increments N (step S934). The imaging apparatus 100 determines whether N is greater than 120 (step S935). If N is equal to or smaller than 120 (step S935: No), the imaging apparatus 100 repeats the processes in step S931 and the steps that follow. If N is greater than 120 (step S935: Yes), the imaging apparatus 100 ends the area A1-A3 overlapping portion exposure process.

Figure 11:
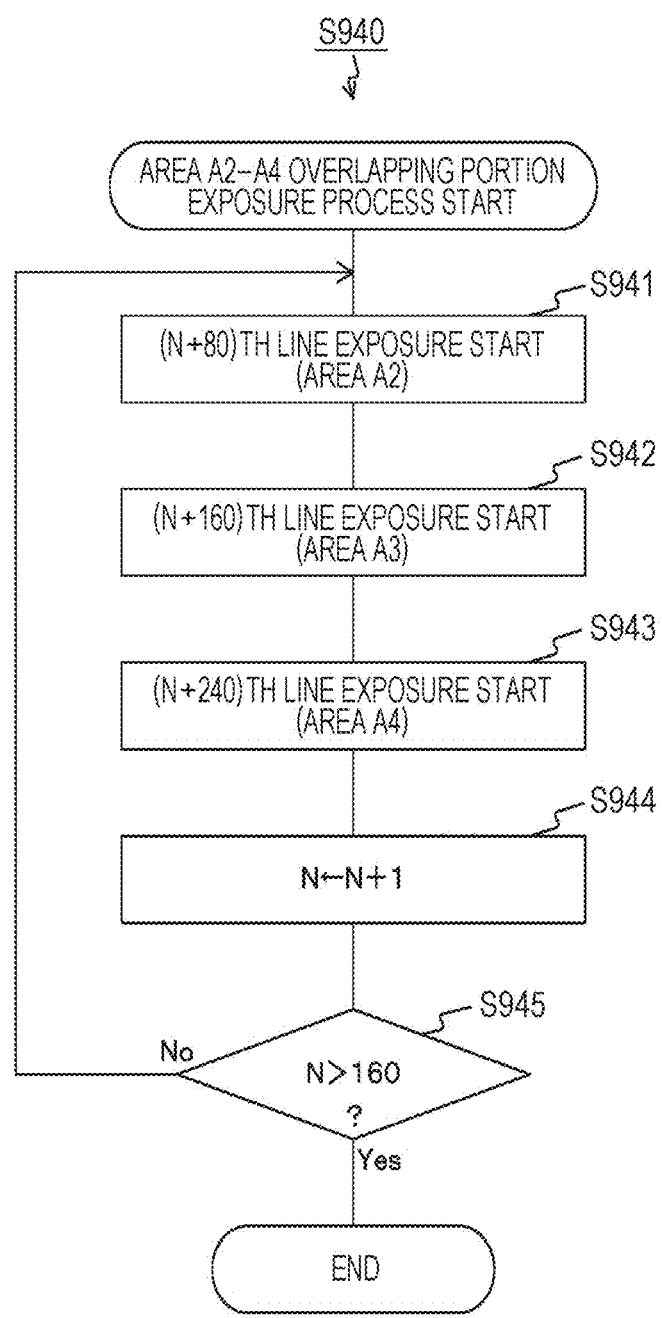
FIG. 11 is a flowchart showing an example of an area A2-A4 overlapping portion exposure process in the first embodiment.

FIG. 11 is a flowchart showing an example of the area A2-A4 overlapping portion exposure process in the first embodiment. The imaging apparatus 100 starts exposing the (N+80)th line (step S941), and starts exposing the (N+160)th line (step S942). The imaging apparatus 100 then starts exposing the (N+240)th line (step S943), and increments N (step S944). The imaging apparatus 100 determines whether N is greater than 160 (step S945). If N is equal to or smaller than 160 (step S945: No), the imaging apparatus 100 repeats the processes in step S941 and the steps that follow. If N is greater than 160 (step S945: Yes), the imaging apparatus 100 ends the area A2-A4 overlapping portion exposure process.

Figure 12:
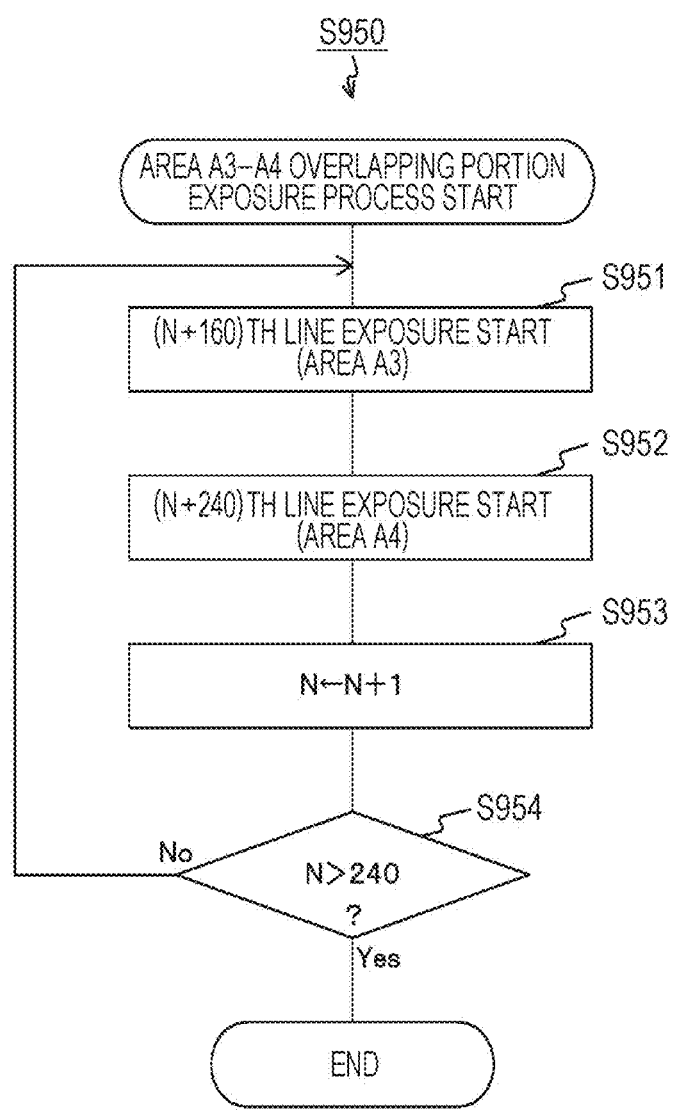
FIG. 12 is a flowchart showing an example of an area A3-A4 overlapping portion exposure process in the first embodiment.

FIG. 12 is a flowchart showing an example of the area A3-A4 overlapping portion exposure process in the first embodiment. The imaging apparatus 100 starts exposing the (N+160)th line (step S951). The imaging apparatus 100 then starts exposing the (N+240)th line (step S952), and increments N (step S953). The imaging apparatus 100 determines whether N is greater than 240 (step S954). If N is equal to or smaller than 240 (step S954: No), the imaging apparatus 100 repeats the processes in step S951 and the steps that follow. If N is greater than 240 (step S954: Yes), the imaging apparatus 100 ends the area A3-A4 overlapping portion exposure process.

Figure 13:
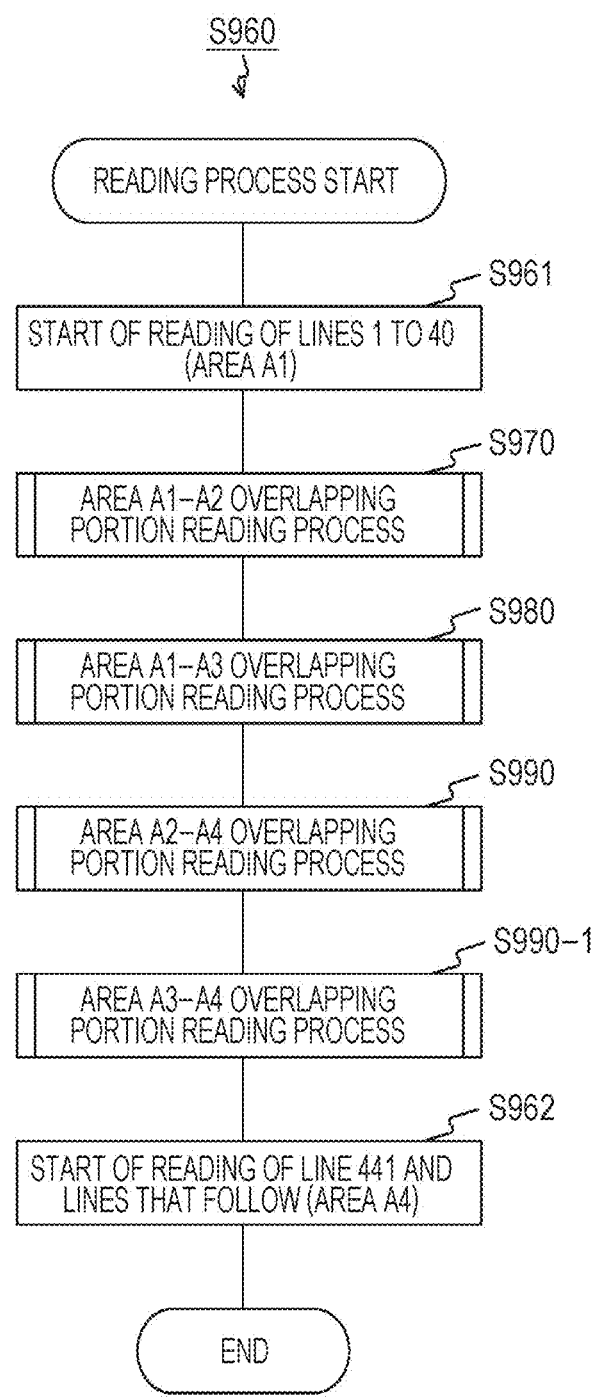
FIG. 13 is a flowchart showing an example of a reading process in the first embodiment.

FIG. 13 is a flowchart showing an example of the reading process in the first embodiment. The imaging apparatus 100 sequentially starts reading the first through 40th lines (step S961), and performs an area A1-A2 overlapping portion reading process to read the overlapping portions in the areas A1 and A2 (step S970). The imaging apparatus 100 then performs an area A1-A3 overlapping portion reading process to read the overlapping portions in the areas A1 through A3 (step S980), and performs an area A2-A4 overlapping portion reading process to read the overlapping portions in the areas A2 through A4 (step S990). The imaging apparatus 100 performs an area A3-A4 overlapping portion reading process to read the overlapping portions in the areas A3 and A4 (step S990-1), and sequentially starts reading the 441st line and the lines that follow (step S962). After step S962, the imaging apparatus 100 ends the reading process.

Figure 14:
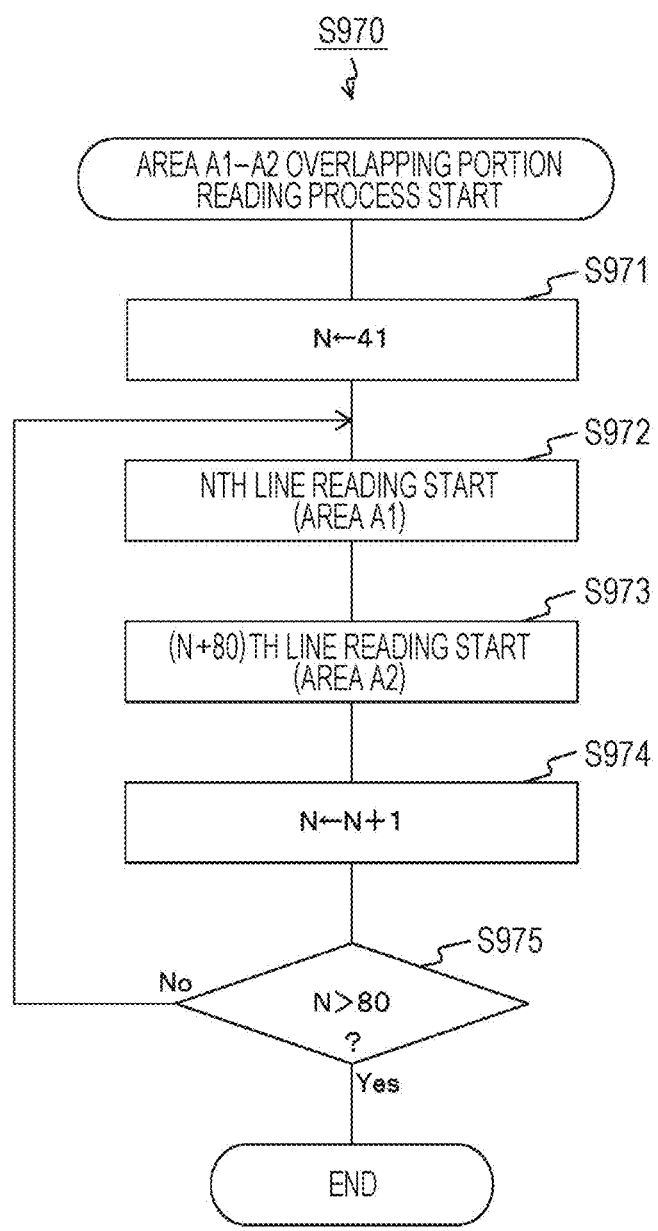
FIG. 14 is a flowchart showing an example of an area A1-A2 overlapping portion reading process in the first embodiment.

FIG. 14 is a flowchart showing an example of the area A1-A2 overlapping portion reading process in the first embodiment. The imaging apparatus 100 initializes N to 41 (step S971), and starts reading the Nth line (step S972). The imaging apparatus 100 then starts reading the (N+80)th line (step S973), and increments N (step S974). The imaging apparatus 100 determines whether N is greater than 80 (step S975). If N is equal to or smaller than 80 (step S975: No), the imaging apparatus 100 repeats the processes in step S972 and the steps that follow. If N is greater than 80 (step S975: Yes), the imaging apparatus 100 ends the area A1-A2 overlapping portion reading process.

Figure 15:
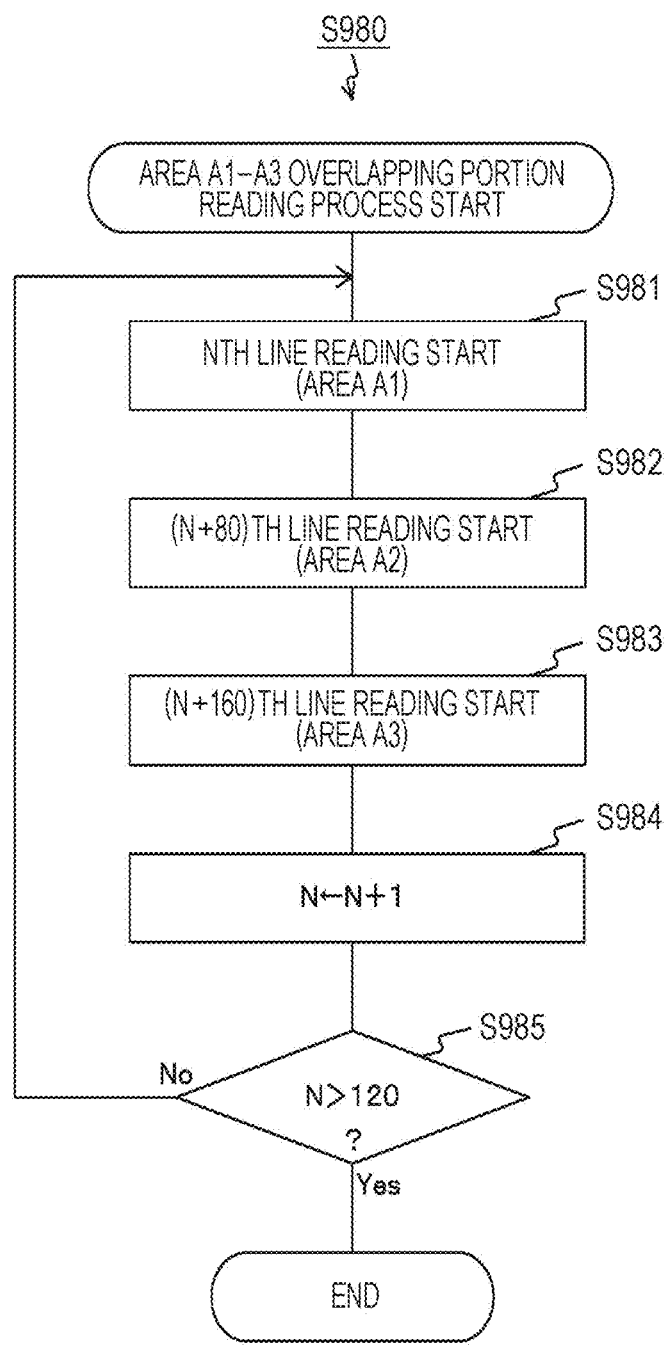
FIG. 15 is a flowchart showing an example of an area A1-A3 overlapping portion reading process in the first embodiment.

FIG. 15 is a flowchart showing an example of the area A1-A3 overlapping portion reading process in the first embodiment. The imaging apparatus 100 starts reading the Nth line (step S981), and starts reading the (N+80)th line (step S982). The imaging apparatus 100 then starts reading the (N+160)th line (step S983), and increments N (step S984). The imaging apparatus 100 determines whether N is greater than 120 (step S985). If N is equal to or smaller than 120 (step S985: No), the imaging apparatus 100 repeats the processes in step S981 and the steps that follow. If N is greater than 120 (step S985: Yes), the imaging apparatus 100 ends the area A1-A3 overlapping portion reading process.

Figure 16:
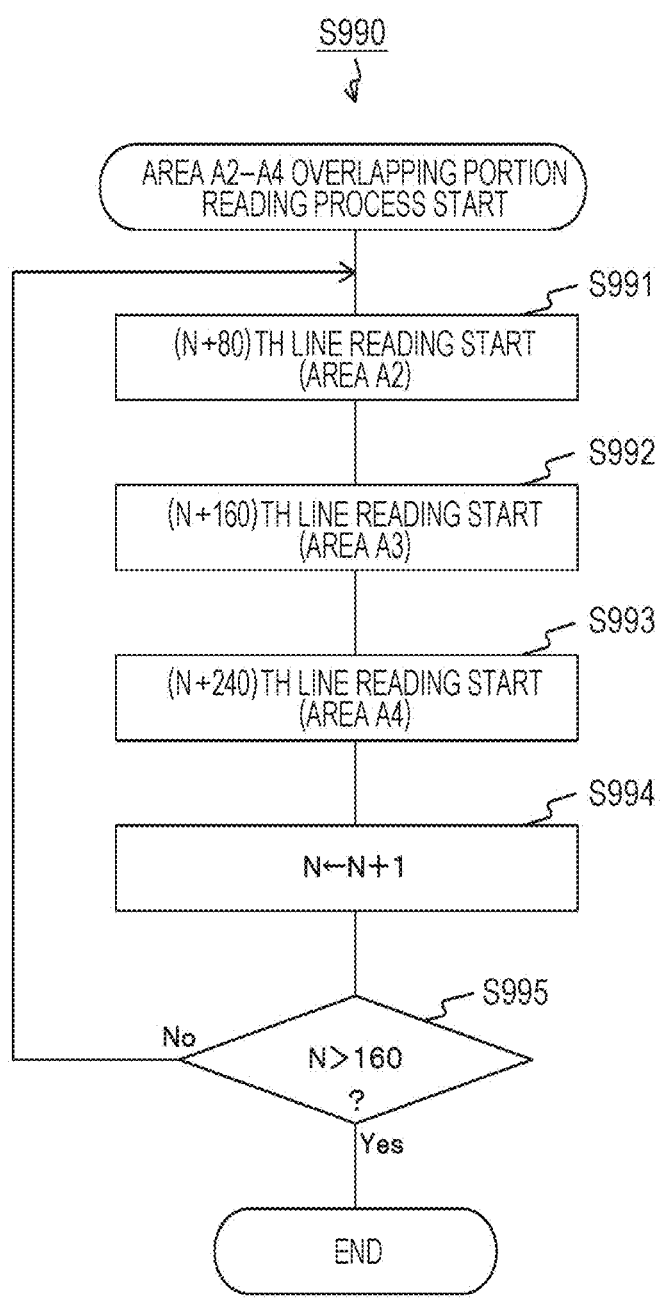
FIG. 16 is a flowchart showing an example of an area A2-A4 overlapping portion reading process in the first embodiment.

FIG. 16 is a flowchart showing an example of the area A2-A4 overlapping portion reading process in the first embodiment. The imaging apparatus 100 starts reading the (N+80)th line (step S991), and starts reading the (N+160)th line (step S992). The imaging apparatus 100 then starts reading the (N+240)th line (step S993), and increments N (step S994). The imaging apparatus 100 determines whether N is greater than 160 (step S995). If N is equal to or smaller than 160 (step S995: No), the imaging apparatus 100 repeats the processes in step S991 and the steps that follow. If N is greater than 160 (step S995: Yes), the imaging apparatus 100 ends the area A2-A4 overlapping portion reading process.

Figure 17:
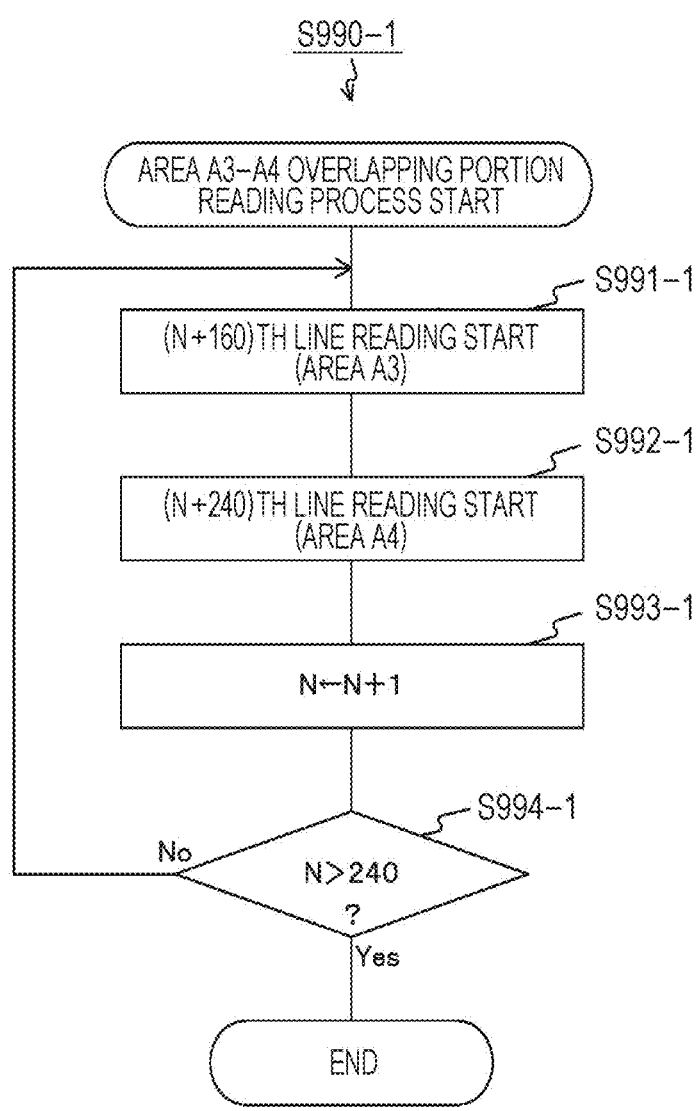
FIG. 17 is a flowchart showing an example of an area A3-A4 overlapping portion reading process in the first embodiment.

FIG. 17 is a flowchart showing an example of the area A3-A4 overlapping portion reading process in the first embodiment. The imaging apparatus 100 starts reading the (N+160)th line (step S991-1). The imaging apparatus 100 then starts reading the (N+240)th line (step S992-1), and increments N (step S993-1). The imaging apparatus 100 determines whether N is greater than 240 (step S994-1). If N is equal to or smaller than 240 (step S994-1: No), the imaging apparatus 100 repeats the processes in step S951 and the steps that follow. If N is greater than 240 (step S994-1: Yes), the imaging apparatus 100 ends the area A3-A4 overlapping portion reading process.

As described above, according to the first embodiment of the present technology, the vertical scanning circuit 240 starts exposure of a line in a first image, and starts exposure of the corresponding line in a second image. Accordingly, the difference in the exposure timing between the corresponding lines can be reduced. Thus, distortion due to the difference in the exposure timing can be prevented or reduced in the areas A1 and A2, and the image quality of the image obtained by combining these images can be increased.

[First Modification]

In the above described first embodiment, an image is formed on the entire light receiving surface. However, light may be blocked by a member or the like around the microlenses 111, and an image may not be formed on part of the light receiving surface. In this case, there is no need to expose the line(s) on which no image is to be formed. An imaging apparatus 100 of a first modification differs from the first embodiment in that exposure is not performed on the lines on which no image is to be formed.

Figure 18:
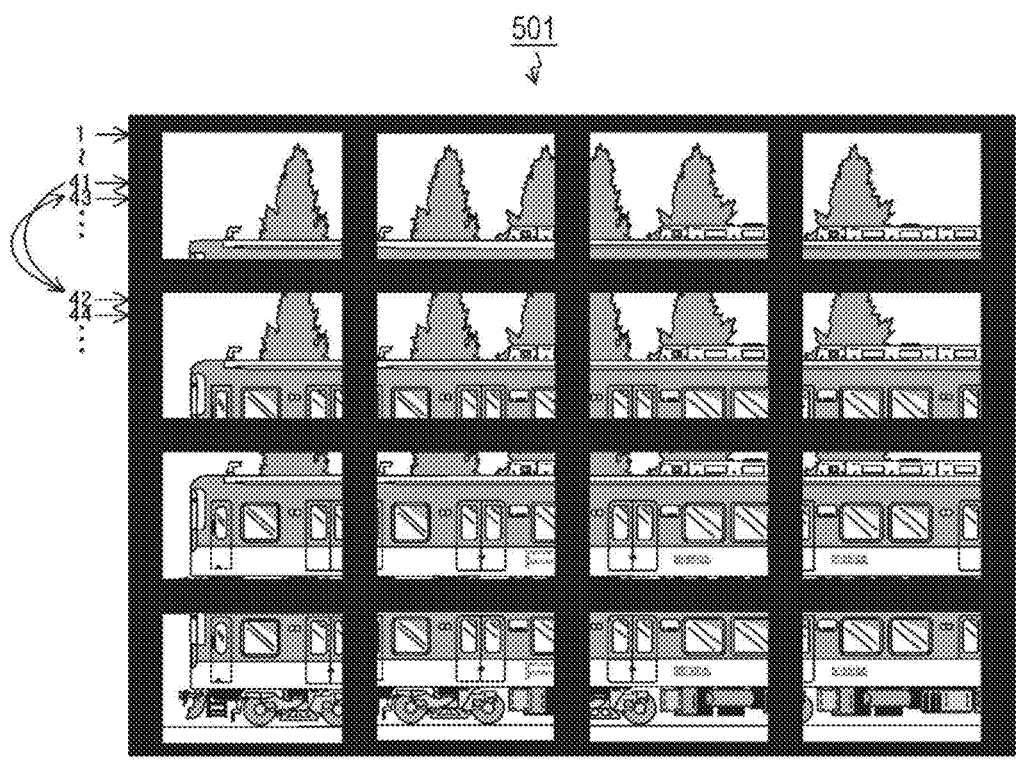
FIG. 18 is a diagram for explaining a scanning method in a first modification of the first embodiment.

FIG. 18 is a diagram for explaining a scanning method in the first modification of the first embodiment. The pixel array unit 220 generates image data 501 including 16 images and an area where no image is to be formed (hereinafter referred to as the "invalid area"). In the drawing, the black area indicates the invalid area.

The vertical scanning circuit 240 of the first modification exposes a line not included in the invalid area in the area A1, and then exposes the corresponding line in the area A2. The ADC 260 of the modification also reads a pixel signal from the line not included in the invalid area.

As described above, according to the first modification of the first embodiment, the vertical scanning circuit 240 does not expose the lines in the invalid area. Thus, the time required to complete the exposure of all the lines can be shortened.

[Second Modification]

In the above described first embodiment, 16 microlenses 111 are provided. However, more than 16 microlenses 111 may be prepared. An imaging apparatus 100 of a second modification differs from the second embodiment in including more than 16 microlenses 111.

Figure 19:
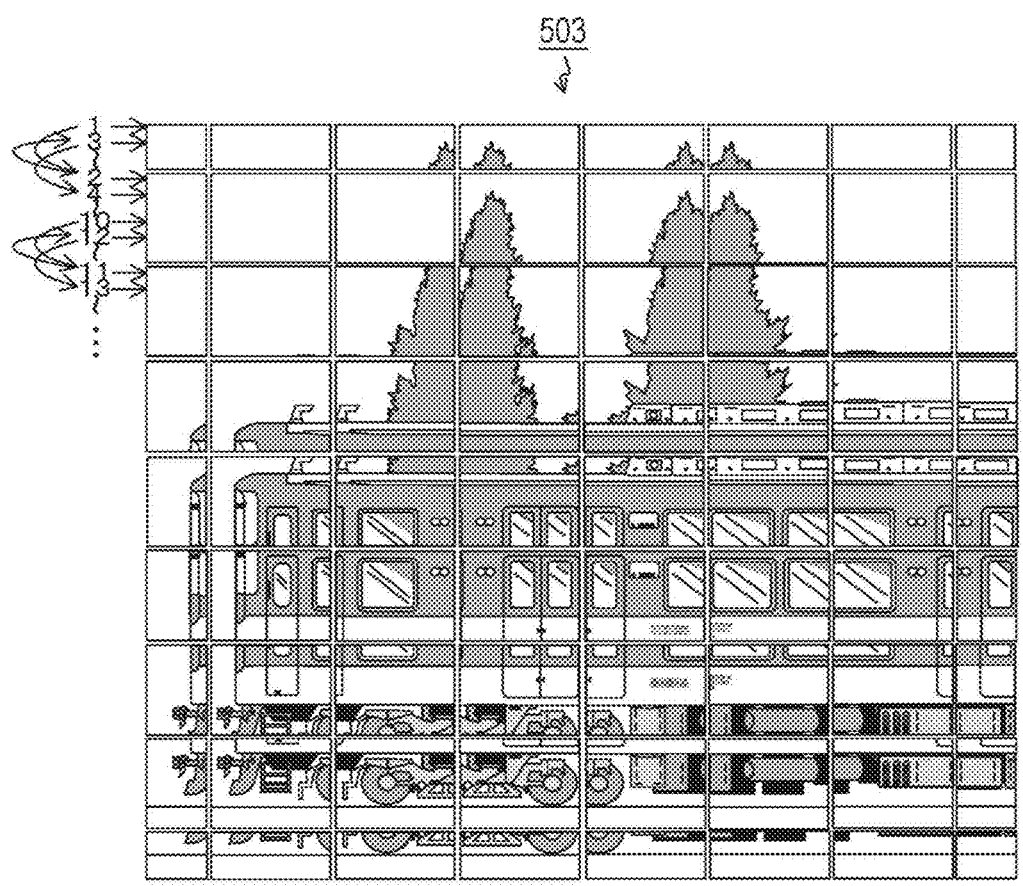
FIG. 19 is a diagram showing an example of image data in a second modification of the first embodiment.

FIG. 19 is a diagram showing an example of image data 503 in the second modification of the first embodiment. The imaging lens 110 of the first modification includes 72 (8×9) microlenses 111. Through these microlenses 111, 72 images that partially overlap are formed on the pixel array unit 220.

As described above, according to the second modification, the imaging apparatus 100 has an increased number of microlenses 111. Thus, it is possible to generate an image with a field of view widened by an amount equivalent to the increase in the number of microlenses 111.

[Third Modification]

In the above described first embodiment, the imaging lens 110 forms an erected image. However, any correction lens may not be provided in the imaging lens 110 so that an inverted image in which the vertical and horizontal directions are reversed can be formed. An imaging apparatus 100 of a third modification differs from the second embodiment in that multiple inverted images are formed.

Figure 20A:
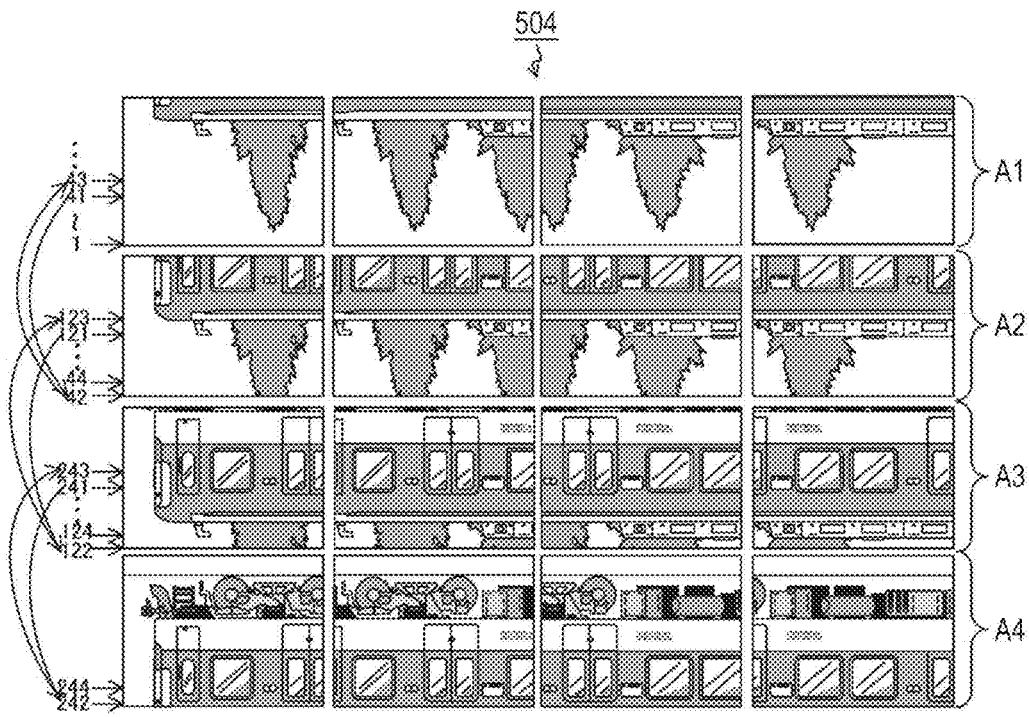
FIGS. 20a and 20b are diagrams for explaining a scanning method in a third modification of the first embodiment.
Figure 20B:
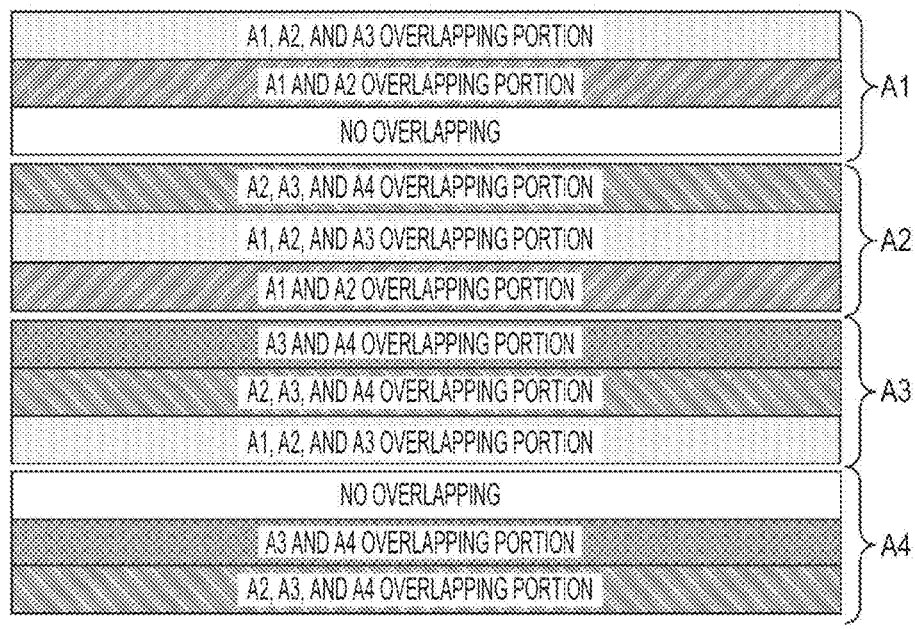

FIGS. 20a and 20b are diagrams for explaining a scanning method in the third modification of the first embodiment. It should be noted that a of FIG. 20a is an example of image data 504 in the second modification of the first embodiment. Meanwhile, FIG. 20b is a diagram showing overlapping portions in the respective areas.

For example, the lower portion of the area A1 does not overlap with any of the other areas. Meanwhile, the central portion of the area A1 and the lower portion of the area A2 overlap, and the upper portion of the area A1, the central portion of the area A2, and the lower portion of the area A3 overlap.

Also, the upper portion of the area A2, the central portion of the area A3, and the lower portion of the area A4 overlap, and the upper portion of the area A3 and the central portion of the area A4 overlap. The upper portion of the area A4 does not overlap with any of the other areas.

First, in the area A1, the vertical scanning circuit 240 sequentially exposes the lines starting from the line adjacent to the area A2. The corresponding lines in the respective overlapping portions of the areas are then sequentially exposed. For example, the last line in the central portion of the area A1 is exposed, and the last line in the lower portion of the area A2 is then exposed.

As described above, according to the first modification of the first embodiment, the imaging apparatus 100 exposes the respective lines in accordance with inverted images. Therefore, the correction lens for forming erected images becomes unnecessary. Thus, the number of the components of the imaging apparatus 100 can be reduced.

[Fourth Modification]

In the above described first embodiment, the imaging apparatus 100 performs exposure by a rolling shutter method. However, exposure may be performed by a global shutter method in which all lines are simultaneously exposed. An imaging apparatus 100 of a fourth modification differs from the first embodiment in that exposure is performed by a global shutter method.

Figure 21:
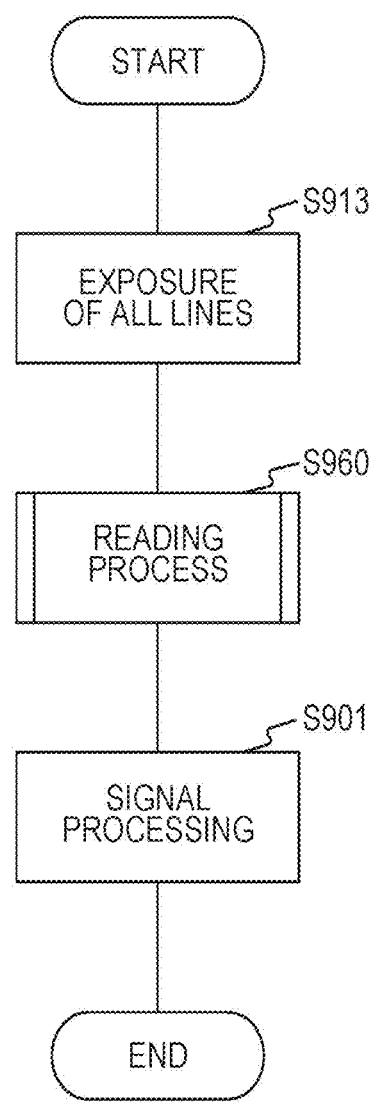
FIG. 21 is a flowchart showing an example operation of an imaging apparatus in a fourth modification of the first embodiment.

FIG. 21 is a flowchart showing an example operation of the imaging apparatus in the fourth modification of the first embodiment. This operation differs from the first embodiment in that step S913 is carried out instead of step S901.

The vertical scanning circuit 240 simultaneously exposes all the lines (step S913). Then, after completion of the exposure, the imaging apparatus 100 carries out step S960 and the step that follows.

By such a global shutter method, there is no difference in the exposure timing between lines. However, if there is a large difference in the read timing between lines, image quality might be degraded. For example, as the time from the completion of exposure to the start of reading becomes longer, the level of dark current might become higher, or photoelectric conversion might occur due to light leaking from the surrounding area within that time. Therefore, if the difference in the read timing between lines is large, the difference in signal quality between the lines is large, and the image quality of the combined image becomes lower. A line in an overlapping portion of the area A1 is read, and the corresponding line in the area A2 is then read, so that the difference in the read timing between the corresponding lines becomes smaller. As a result, degradation of image quality can be prevented or reduced.

It should be noted that, in the second and third embodiments that will be described later, an imaging apparatus 100 may also perform exposure by a global shutter method, and perform reading similar to that in the first embodiment.

As described above, according to the fourth modification of the first embodiment, the imaging apparatus 100 reads a line in the first image and then reads the corresponding line in the second image. Accordingly, the difference in the read timing between the corresponding lines can be reduced. Thus, image quality degradation due to a difference in the read timing can be prevented or reduced in the area A1 and A2.

2. Second Embodiment

In the above described first embodiment, image signals are read by the single column ADC 260. However, image signals may be read by two column ADCs. As two column ADCs 260 are provided, the vertical scanning circuit 240 can simultaneously start exposure of two lines and simultaneously perform reading of the two lines. An imaging apparatus 100 of a second embodiment differs from the first embodiment in that two column ADCs are provided so that exposure of two lines is simultaneously started.

Figure 22:
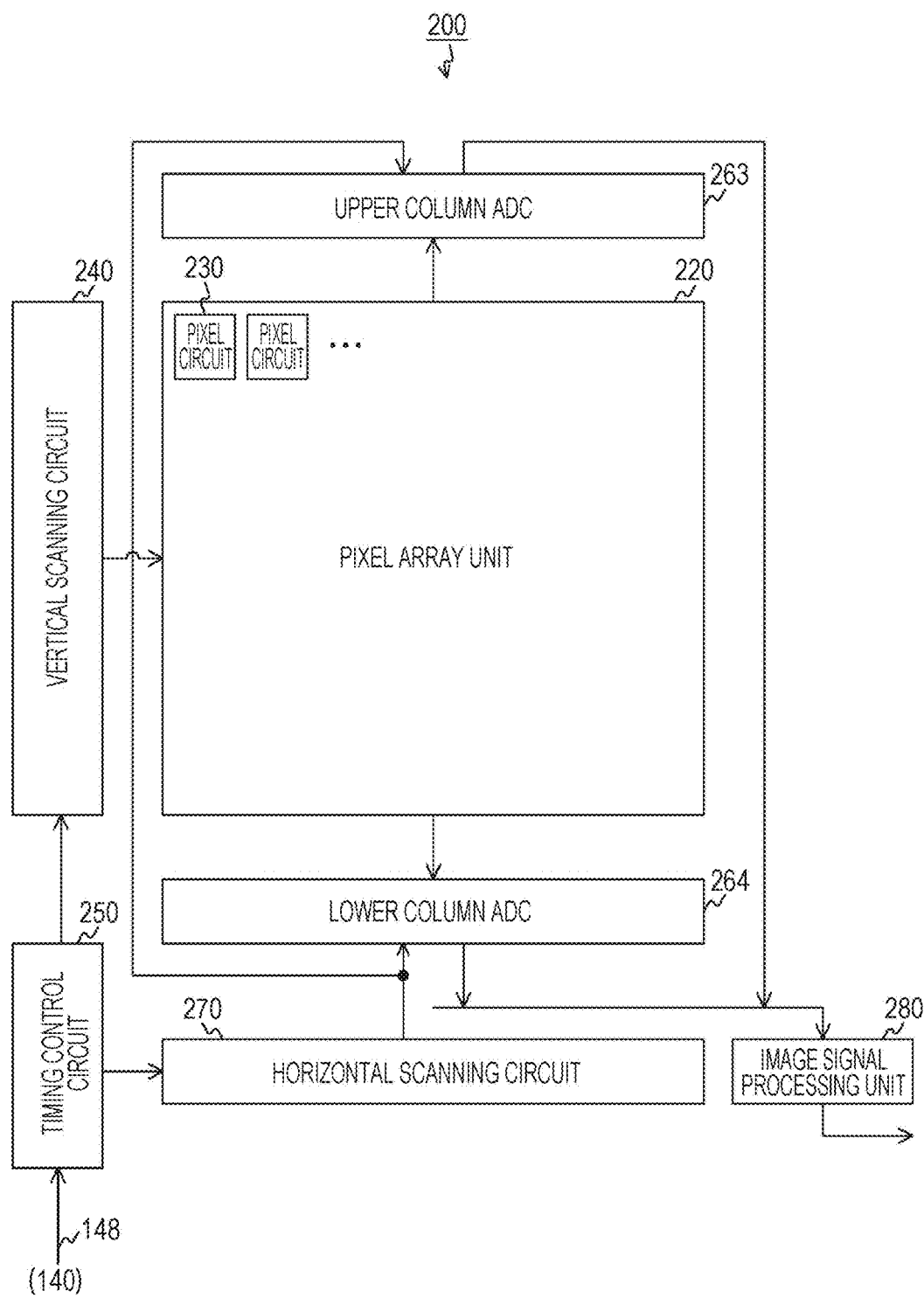
FIG. 22 is a block diagram showing an example configuration of an imaging device in a second embodiment.

FIG. 22 is a block diagram showing an example configuration of an imaging device 200 in the second embodiment. The imaging device 200 of the third embodiment differs from the first embodiment in including an upper column ADC 263 and a lower column ADC 264, instead of the column ADC 260.

Figure 23:
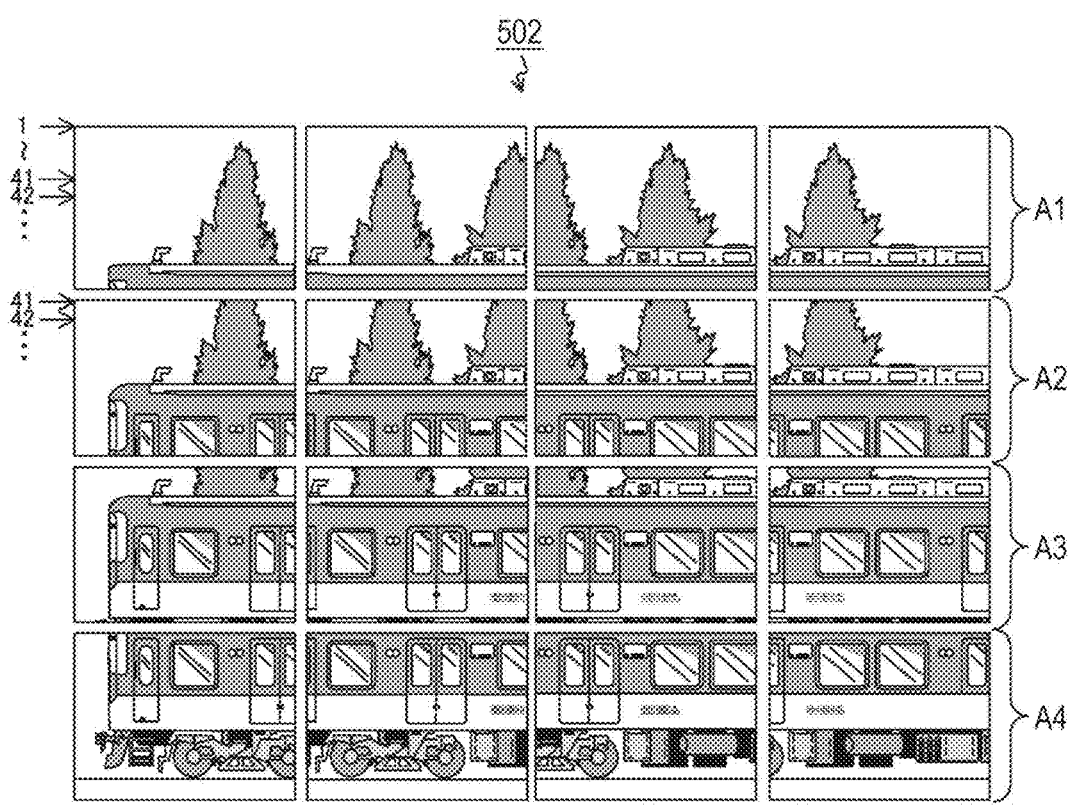
FIG. 23 is a diagram for explaining a scanning method in the second embodiment.

FIG. 23 is a diagram for explaining a scanning method in the second embodiment. As shown in the drawing, a vertical scanning circuit 240 of the second embodiment performs simultaneous exposure of two corresponding lines between the overlapping portions in areas A1 and A2. The vertical scanning circuit 240 also performs simultaneous exposure of two corresponding lines between the overlapping portions in areas 3 and A4.

Figure 24:
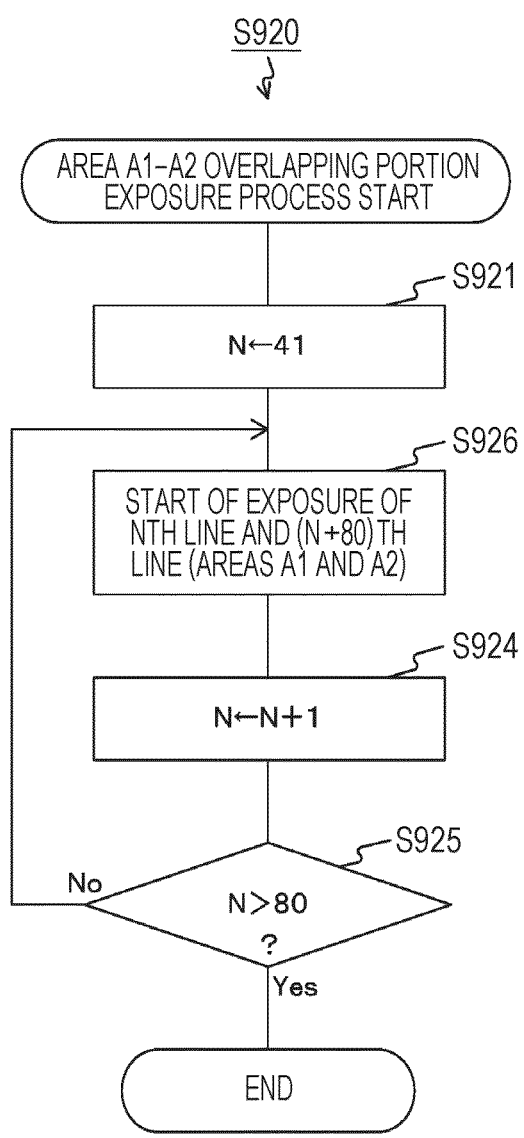
FIG. 24 is a flowchart showing an example of an area A1-2 overlapping portion exposure process in the second embodiment.

FIG. 24 is a flowchart showing an example of an area A1-2 overlapping portion exposure process in the second embodiment. The area A1-2 overlapping portion exposure process of the second embodiment differs from the first embodiment in that step S926 is carried out instead of steps S922 and S923.

After step S921, the imaging apparatus 100 simultaneously starts exposing the Nth line and the (N+80)th line (step S961). The imaging apparatus 100 then carries out step S924 and the steps that follow. In an area A1-3 overlapping portion exposure process, the imaging apparatus 100 also performs simultaneous exposure of two corresponding lines between the areas A1 and A2. In an area A2-4 overlapping portion exposure process and an area A3-A4 overlapping portion exposure process, the imaging apparatus 100 also performs simultaneous exposure of two corresponding lines between the overlapping portions in the areas A3 and A4.

As described above, according to the second embodiment of the present technology, the vertical scanning circuit 240 performs simultaneous exposure of two corresponding lines. Thus, the time required to complete the exposure of all the lines can be made shorter than that in a case where the lines are sequentially exposed.

[Modification]

In the above described second embodiment, two columns ADC are provided, and exposure of two corresponding lines is simultaneously started. However, four column ADCs may be provided. An imaging apparatus 100 of a modification of the second embodiment differs from the first embodiment in that four column ADCs are provided so that exposure of four corresponding lines is simultaneously started.

Figure 25:
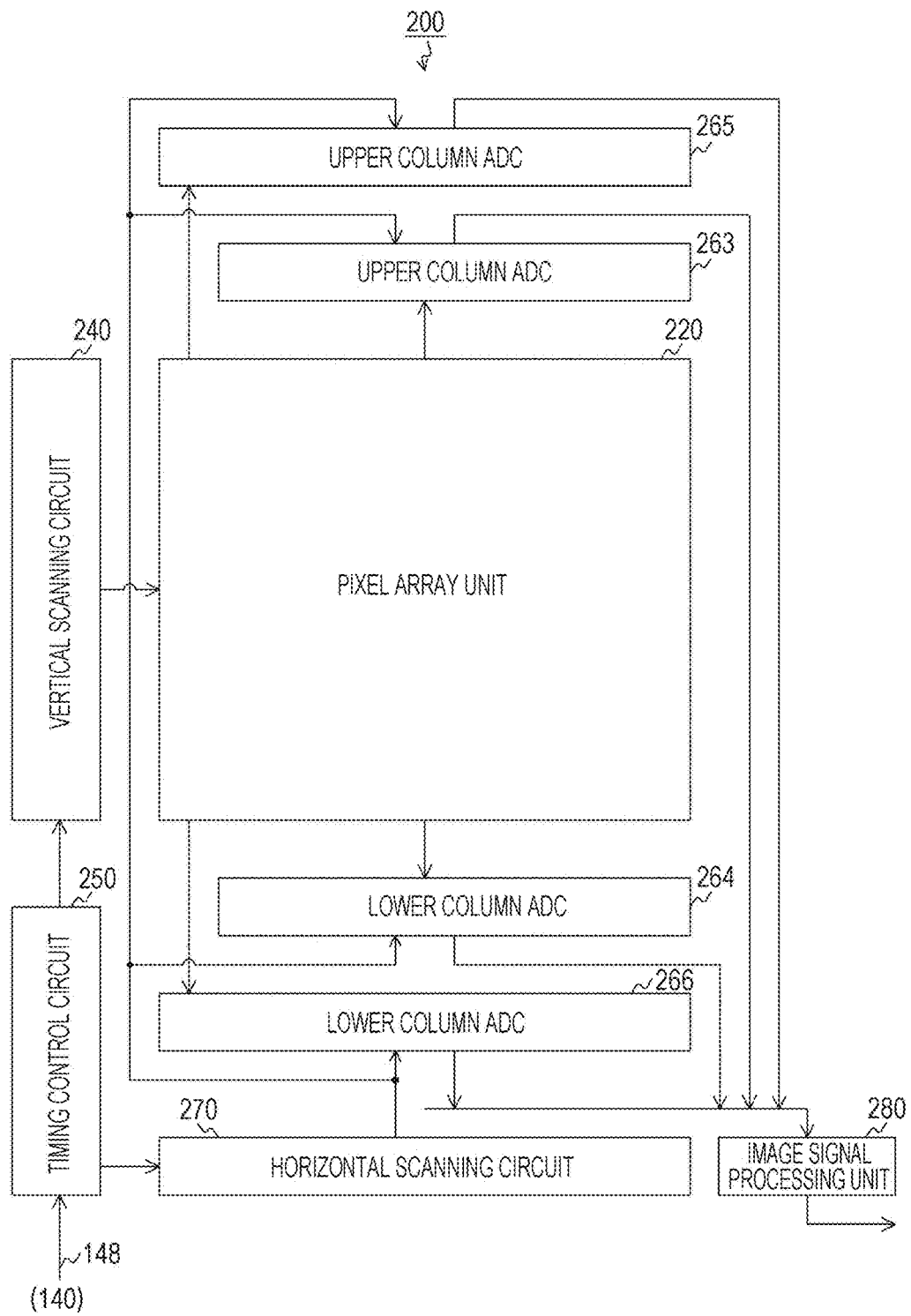
FIG. 25 is a block diagram showing an example configuration of an imaging device in a modification of the second embodiment.

FIG. 25 is a block diagram showing an example configuration of an imaging device 200 in the modification of the second embodiment. The imaging device 200 of the modification differs from the second embodiment in further including an upper column ADC 265 and a lower column ADC 266.

The upper column ADC 263 reads pixel signals from the lines in the area A1, and the upper column ADC 263 reads pixel signals from the lines in the area A2. Meanwhile, the lower column ADC 264 reads pixel signals from the lines in the area A3, and the lower column ADC 266 reads pixel signals from the lines in the area A4.

It should be noted that, in a case where the number of the areas in image data is greater than four, more than four column ADCs may be provided in the imaging device 200.

As described above, according to the modification of the second embodiment, the vertical scanning circuit 240 performs simultaneous exposure of up to four lines. Thus, the time required to complete the exposure of all the lines can be further shortened.

3. Third Embodiment

In the above described first embodiment, the circuits in the imaging device 200 are provided in one semiconductor chip. However, these circuits may be provided separately in stacked chips. An imaging device 200 of the fourth embodiment differs from the first embodiment in that the circuits in the imaging device 200 are provided separately in stacked chips.

Figure 26:
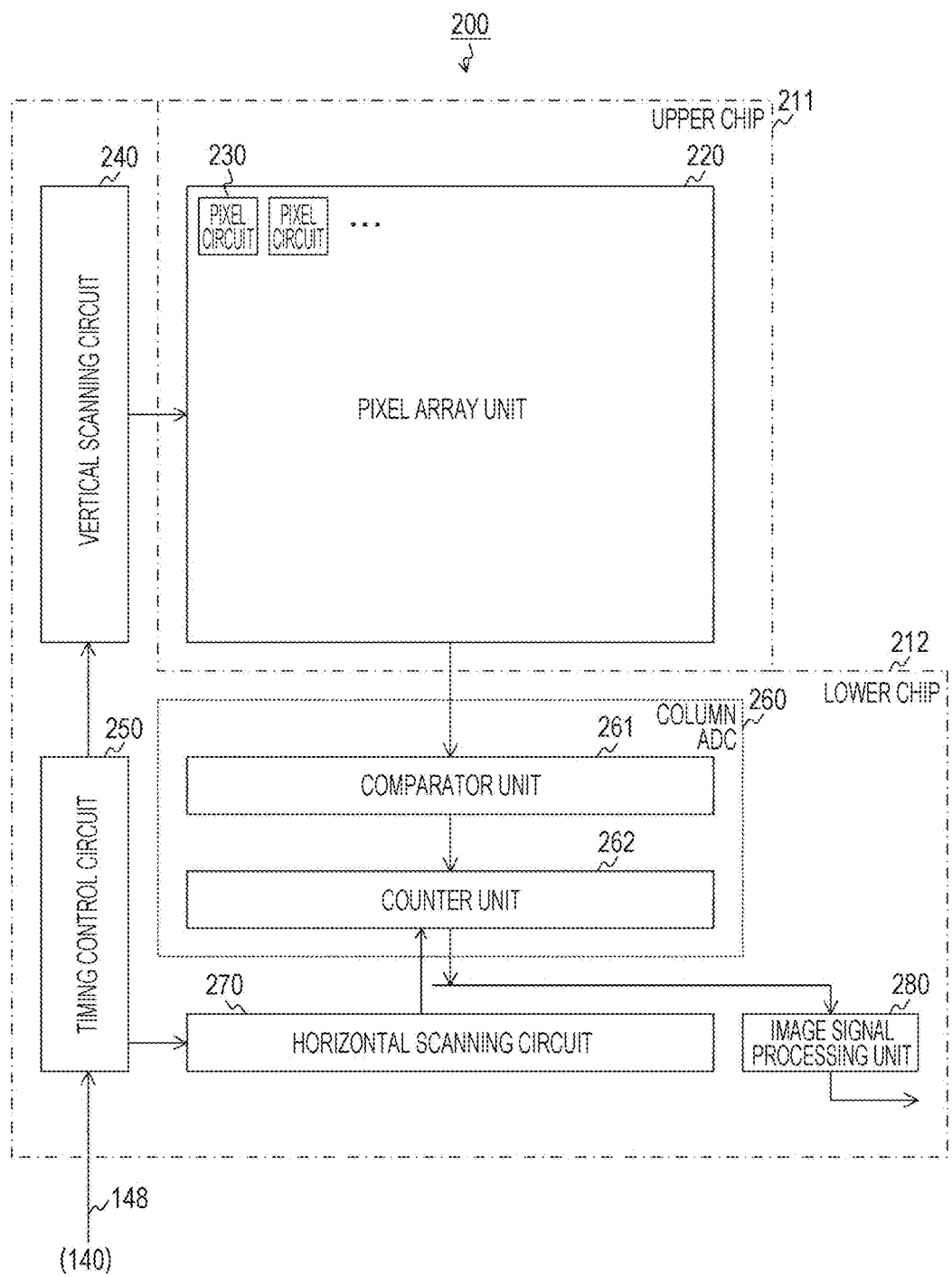
FIG. 26 is a block diagram showing an example configuration of an imaging device in a third embodiment.

FIG. 26 is a block diagram showing an example configuration of the imaging device 200 in the third embodiment. The imaging device 200 of the fourth embodiment differs from the first embodiment in including an upper chip 211 and a lower chip 212.

A pixel array unit 220 is provided in the upper chip 211. A vertical scanning circuit 240, a timing control circuit 250, a column ADC 260, a horizontal scanning circuit 270, and an image signal processing unit 280 are provided in the lower chip 212.

It should be noted that, in addition to the pixel array unit 220, at least one of the vertical scanning circuit 240, the timing control circuit 250, the column ADC 260, the horizontal scanning circuit 270, and the image signal processing unit 280 may be further provided in the upper chip 211.

Figure 27:
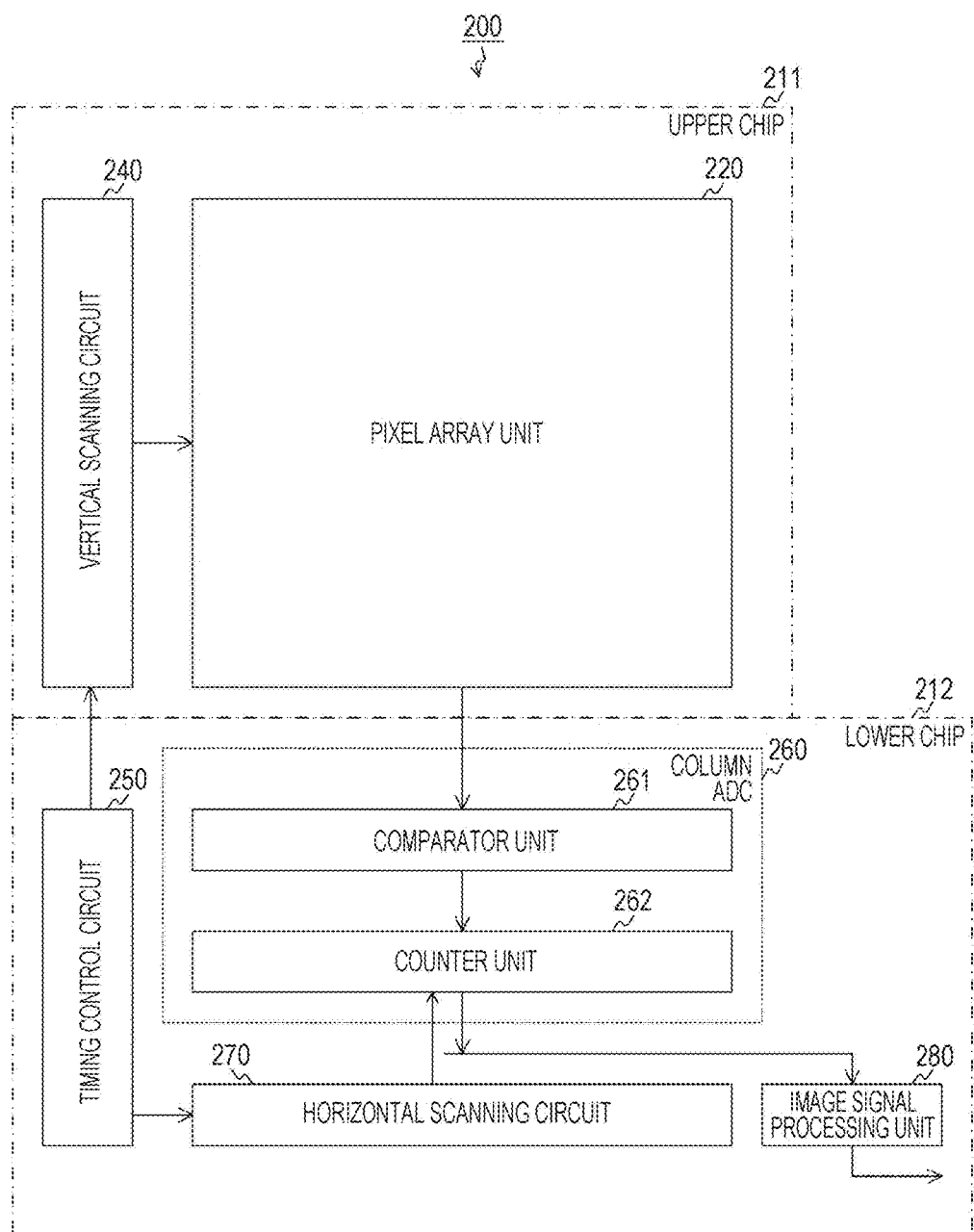
FIG. 27 is a block diagram showing an example configuration of an imaging device in which a vertical scanning circuit in the third embodiment is provided in an upper chip.
Figure 28:
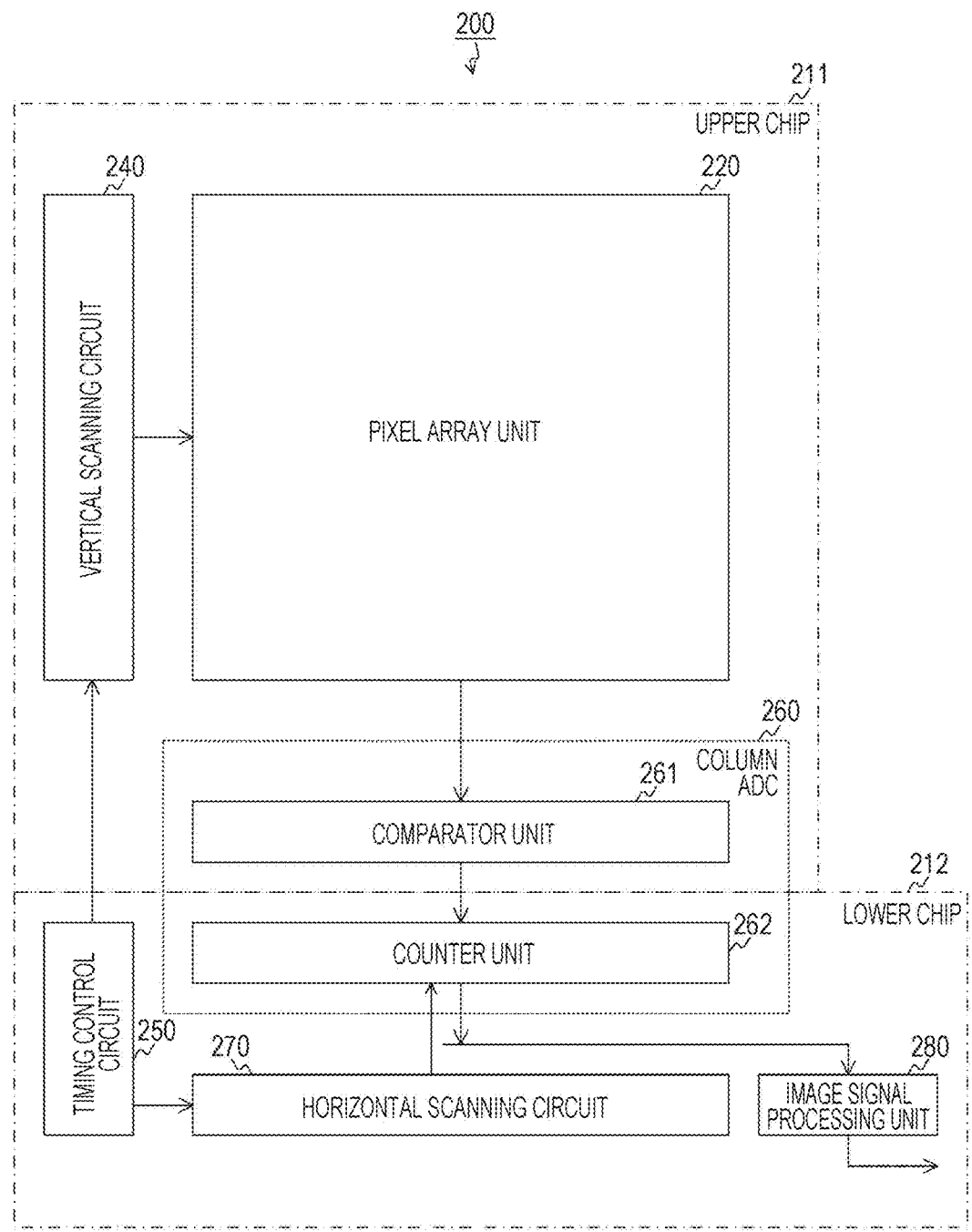
FIG. 28 is a block diagram showing an example configuration of an imaging device in which the vertical scanning circuit and a comparator unit in the third embodiment are provided in an upper chip.
Figure 29:
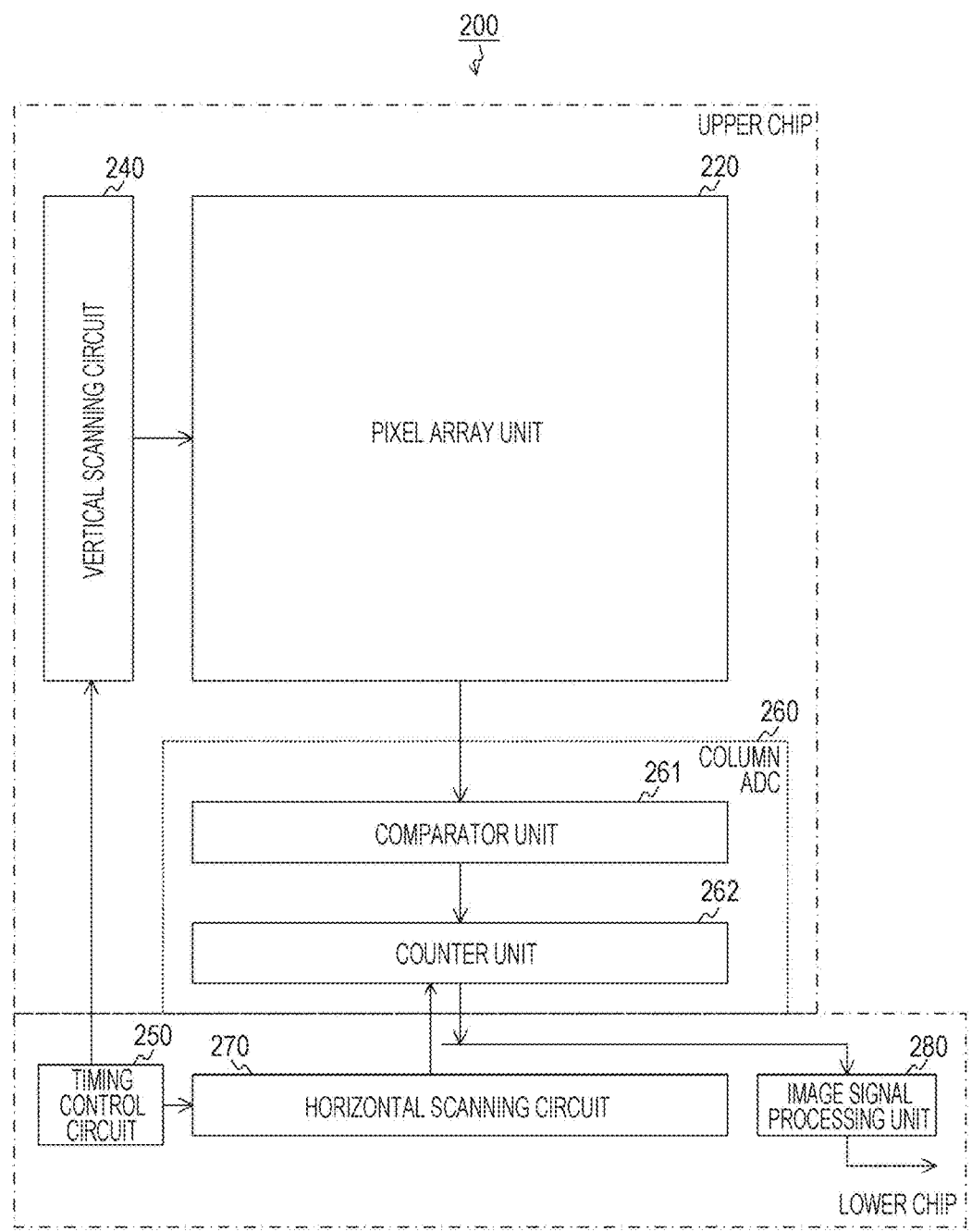
FIG. 29 is a block diagram showing an example configuration of an imaging device in which the vertical scanning circuit and a column ADC in the third embodiment are provided in an upper chip.

For example, as shown in an example in FIG. 27, the pixel array unit 220 and the vertical scanning circuit 240 may be provided in the upper chip 211. As shown in an example in FIG. 28, the pixel array unit 220, a comparator unit 261, and the vertical scanning circuit 240 may be provided in the upper chip 211. Alternatively, as shown in an example in FIG. 29, the pixel array unit 220, the column ADC 260, and the vertical scanning circuit 240 may be provided in the upper chip 211.

Figure 30:
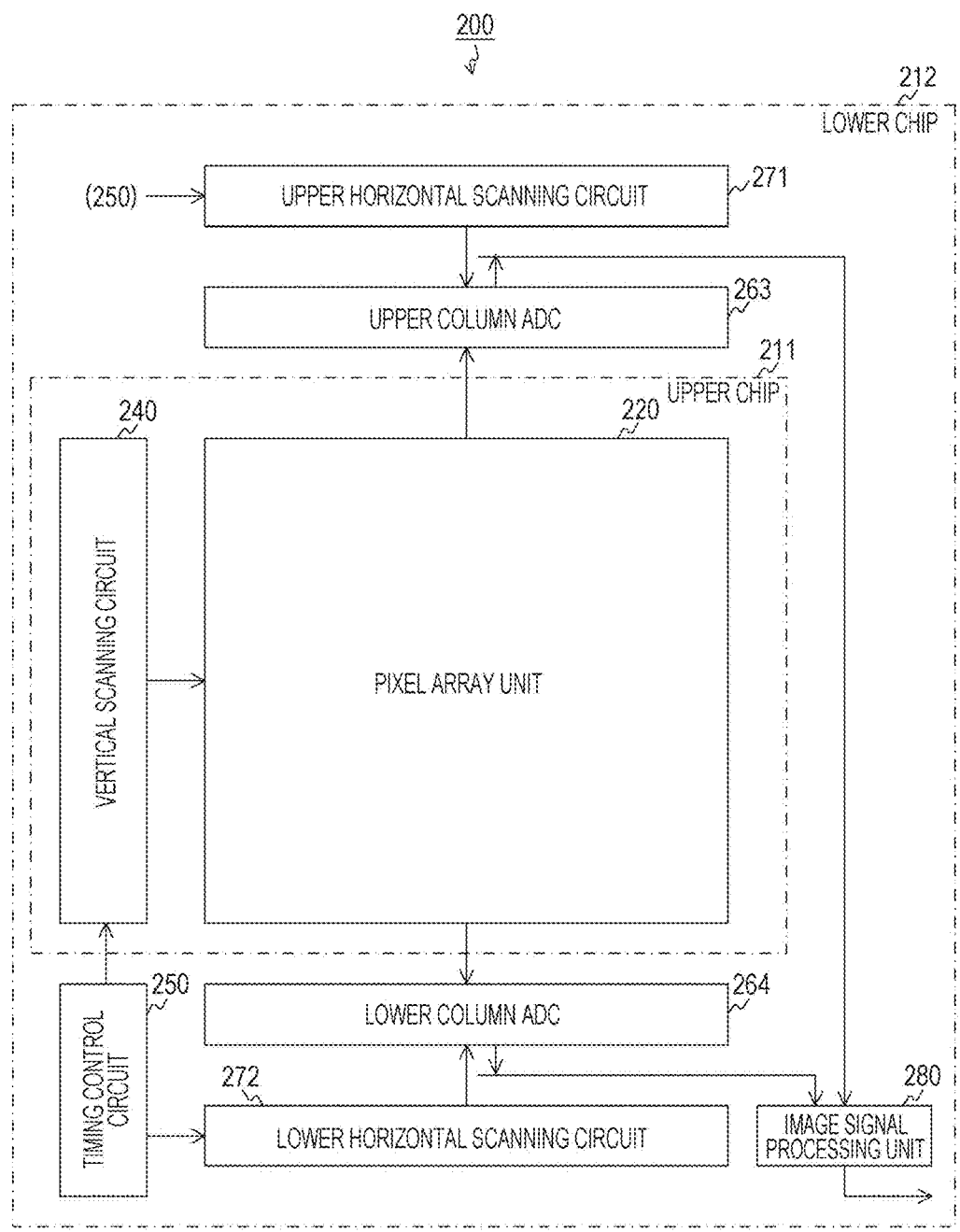
FIG. 30 is a block diagram showing an example configuration of an imaging device in which two columns ADCs in the third embodiment are provided in a lower chip.
Figure 31:
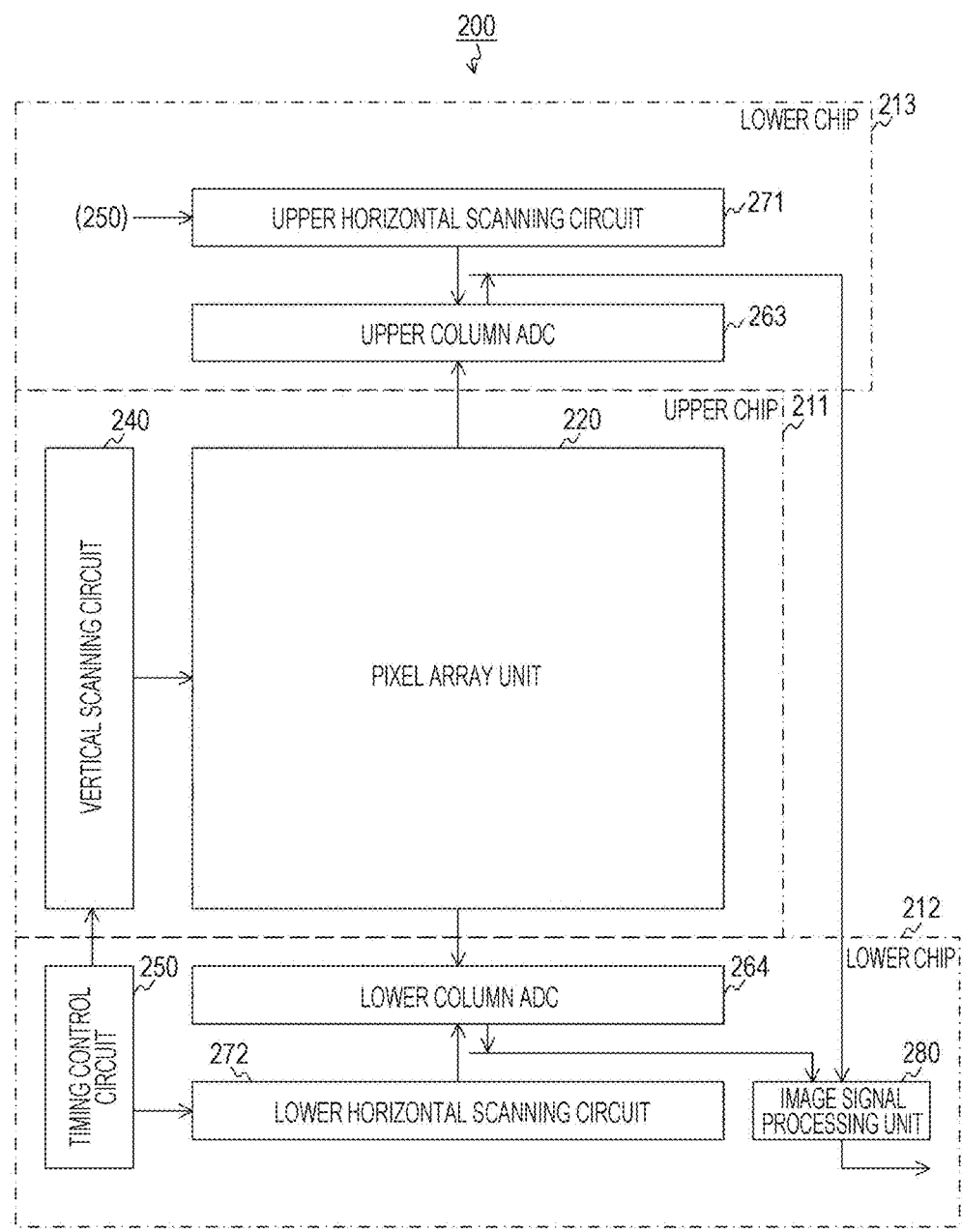
FIG. 31 is a block diagram showing an example configuration of an imaging device including two lower chips in the third embodiment.

Also, as shown in an example in FIG. 30, the pixel array unit 220 and the vertical scanning circuit 240 may be provided in the upper chip 211, and two column ADCs and two horizontal scanning circuits may be provided in the lower chip 212. Further, as shown in an example in FIG. 31, two lower chips may be provided, an upper column ADC 263 and an upper horizontal scanning circuit 271 being provided in one of the lower chips, the timing control circuit 250, a lower column ADC 264, and a lower horizontal scanning circuit 272 being provided in the other one of the lower chips.

As described above, according to the third embodiment of the present technology, the circuits in the imaging device 200 are disposed separately in multiple semiconductor chips. Thus, the area of the light receiving surface can be increased.

It should be noted that the above described embodiments are examples for embodying the present technology, and the matter of the embodiments corresponds to the subject matter of the claims. Similarly, the subject matter of the claims corresponds to the matter under the same names as the subject matter of the claims in the embodiments of the present technology. However, the present technology is not limited to the embodiments, and various changes can be made to the embodiments without departing from the scope of the technology.

Also, the processing procedures described above in the embodiments may be regarded as a method involving the series of these procedures, or may be regarded as a program for causing a computer to carry out the series of these procedures or as a recording medium storing the program. This recording medium may be a compact disc (CD), a minidisc (MD), a digital versatile disc (DVD), a memory card, or a Blu-ray (registered trademark) disc, for example.

It should be noted that the effect of the present technology is not necessarily limited to that described herein, and may be any effect described in the present disclosure.

It should be noted that the present technology may also be embodied in the configurations described below.

(1) An imaging apparatus including:
a plurality of lines each having a plurality of pixels arranged in a predetermined direction, the pixels generating pixel signals by performing exposure when supplied with an exposure start signal;
first and second lenses that form first and second images on a light receiving surface on which the lines are arranged, the first and second images partially overlapping at overlapping portions;
a scanning unit that sequentially selects a line in the overlapping portion of the first image among the lines, and supplies the exposure start signal to the selected line and the corresponding line in the overlapping portion of the second image, the corresponding line corresponding to the selected line; and
a combining unit that combines a plurality of images formed from the pixel signals into one image.

(2) The imaging apparatus of (1), in which the scanning unit sequentially performs a process of supplying the exposure signal sequentially to the lines not included in the overlapping portions, and a process of supplying the exposure start signal sequentially to the corresponding line and the selected line.

(3) The imaging apparatus of (1) or (2), further including
a reading unit that simultaneously reads the pixel signal generated in the selected line and the pixel signal generated in the corresponding line,
in which the scanning unit supplies the exposure start signal simultaneously to the corresponding line and the selected line.

(4) The imaging apparatus of any of (1) to (3), in which the light receiving surface includes an invalid area in which the first and second images are not to be formed, and the scanning unit supplies the exposure start signal to the lines not included in the invalid area.

(5) The imaging apparatus of any of (1) to (4), in which the first and second images are inverted images, and the scanning unit sequentially selects the lines in the first image, starting from the line adjacent to the second image.

(6) The imaging apparatus of any of (1) to (5), in which the lines and the scanning unit are disposed on different substrates from each other.

(7) An imaging apparatus including:
a plurality of lines each having a plurality of pixels arranged in a predetermined direction, the pixels generating pixel signals;
first and second lenses that form first and second images on a light receiving surface on which the lines are arranged, the first and second images partially overlapping at overlapping portions;
a reading unit that reads the pixel signals from lines designated for reading among the lines;
a scanning unit that causes exposure to be performed on all the lines, sequentially selects a line in the overlapping portion of the first image among the lines, and designates, for the reading, the selected line and the corresponding line in the overlapping portion of the second image, the corresponding line corresponding to the selected line; and
a combining unit that combines a plurality of images formed from the pixel signals into one image.

(8) A method of controlling an imaging apparatus that forms first and second images partially overlapping at overlapping portions,
the method including:
a scanning step of sequentially selecting a line in the overlapping portion of the first image among a plurality of lines each having a plurality of pixels arranged in a predetermined direction, and supplying an exposure start signal to the selected line and the corresponding line in the overlapping portion of the second image, the corresponding line corresponding to the selected line, the scanning step being carried out by a scanning unit; and
a combining step of combining a plurality of images formed from the pixel signals into one image, the combining step being carried out by a combining unit.

(9) A method of controlling an imaging apparatus that forms first and second images partially overlapping at overlapping portions,
the method including:
a scanning step of causing exposure to be performed on all of a plurality of lines each having a plurality of pixels arranged in a predetermined direction, sequentially selecting a line in the overlapping portion of the first image among the lines, and designating, for reading, the selected line and the corresponding line in the overlapping portion of the second image, the corresponding line corresponding to the selected line, the scanning step being carried out by a scanning unit;
a reading step of reading pixel signals from the lines designated for the reading among the lines; and
a combining step of combining a plurality of images formed from the pixel signals into one image, the combining step being carried out by a combining unit.

REFERENCE SIGNS LIST

100 Imaging apparatus
110 Imaging lens
111 Microlens
120 Image processing unit
130 Recording unit
140 Imaging control unit 150 Display unit
200 Imaging device
211 Upper chip
212 Lower chip
220 Pixel array unit
230 Pixel circuit
231 Photodiode
232 Node
233 Transfer transistor
234 Floating diffusion layer
235 Reset transistor
236 Amplification transistor
237 Select transistor
240 Vertical scanning circuit
250 Timing control circuit
260 Column ADC
261 Comparator unit
262 Counter unit
263, 265 Upper column ADC
264, 266 Lower column ADC
270 Horizontal scanning circuit
271 Upper horizontal scanning circuit
272 Lower horizontal scanning circuit
280 Image signal processing unit

The invention claimed is:

1. An imaging apparatus, comprising:
a light receiving surface;
a plurality of lines on the light receiving surface,
wherein each line of the plurality of lines comprises a plurality of pixels arranged in a direction, and
wherein the plurality of pixels are configured to generate a plurality of pixel signals based on an exposure start signal;
a first lens configured to form a first image on the light receiving surface;
a second lens configured to form a second image on the light receiving surface,
wherein the first image and the second image partially overlap each other at an overlapping portion; and
circuitry configured to:
sequentially select a first line from the plurality of lines, wherein the first line is in the overlapping portion of the first image;
supply the exposure start signal to the selected first line and a corresponding line in the overlapping portion of the second image,
wherein the corresponding line corresponds to the selected first line; and
combine a plurality of images formed from the plurality of pixel signals into one image.

2. The imaging apparatus according to claim 1, wherein the circuitry is further configured to:
supply the exposure start signal sequentially to a second line excluded from the overlapping portion; and
supply the exposure start signal sequentially to the corresponding line and the selected first line.

3. The imaging apparatus according to claim 1, wherein the circuitry is further configured to:
simultaneously read a first pixel signal generated in the selected first line and a second pixel signal generated in the corresponding line; and
supply the exposure start signal simultaneously to the corresponding line and the selected first line.

4. The imaging apparatus according to claim 1, wherein the light receiving surface includes an invalid area in which none of the first image and the second image is to be formed, and the circuitry is further configured to supply the exposure start signal to a third line excluded from the invalid area.

5. The imaging apparatus according to claim 1, wherein the first image and the second image are inverted images,
the circuitry is further configured to sequentially select one or more lines from the plurality of lines,
wherein the one or more lines are in the first image, and
the one or more lines are selected starting from a fourth line adjacent to the second image.

6. The imaging apparatus according to claim 1, wherein the plurality of lines and the circuitry are on different substrates.

7. An imaging apparatus, comprising:
a light receiving surface;
a plurality of lines on the light receiving surface,
wherein each line of the plurality of lines comprises a plurality of pixels arranged in a direction, and
wherein the plurality of pixels are configured to generate a plurality of pixel signals;
a first lens configured to form a first image on the light receiving surface;
a second lens configured to form a second image on the light receiving surface,
wherein the first image and the second image partially overlap each other at an overlapping portion; and
circuitry configured to:
read at least one pixel signal from at least one line from the plurality of lines,
wherein the at least one line is designated to be read;
expose all the plurality of lines;
sequentially select a line from the plurality of lines, wherein the selected line in the overlapping portion of the first image;
designate the selected line and a corresponding line in the overlapping portion of the second image to be read,
wherein the corresponding line corresponds to the selected line; and
combine a plurality of images formed from the plurality of pixel signals into one image.

8. A method of controlling an imaging apparatus, the method comprising:
sequentially selecting a line from a plurality of lines,
wherein the selected line is in an overlapping portion of a first image,
wherein the imaging apparatus is configured to form the first image and a second image,
wherein the first image and the second image partially overlap each other in the overlapping portion, and
wherein each line of the plurality of lines comprises a plurality of pixels arranged in a direction;
supplying an exposure start signal to the selected line and a corresponding line in the overlapping portion of the second image,
wherein the corresponding line corresponds to the selected line; and
combining a plurality of images formed from a plurality of pixel signals into one image.

9. A method of controlling an imaging apparatus, the method comprising:
exposing all of a plurality of lines,
wherein each line of the plurality of lines comprises a plurality of pixels arranged in a direction;
sequentially selecting a line from the plurality of lines,
wherein the selected line is in an overlapping portion of a first image, wherein the imaging apparatus is configured to form the first image and a second image, and wherein the first image and the second image partially overlap each other in the overlapping portion;

designating, for reading, the selected line and a corresponding line in the overlapping portion of the second image, wherein the corresponding line corresponds to the selected line;

reading at least one pixel signal from at least one line from the plurality of lines, wherein the at least one line is designated for the reading; and combining a plurality of images formed from a plurality of pixel signals into one image.

* * * * *